(12) United States Patent  (10) Patent No.: US 9,339,136 B2
Higgins  (45) Date of Patent: May 17, 2016

(54) FLOOR COVERINGS WITH UNIVERSAL BACKING AND METHODS OF MAKING, INSTALLING, AND RECYCLING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

(21) Appl. No.: 14/090,190

(22) Filed: Nov. 26, 2013

(65) Prior Publication Data

US 2014/0158276 A1  Jun. 12, 2014

Related U.S. Application Data

(60) Provisional application No. 61/797,496, filed on Dec. 10, 2012.

(51) Int. Cl.
*A47G 27/02* (2006.01)
*D05C 17/02* (2006.01)
(Continued)

(52) U.S. Cl.
CPC ............. *A47G 27/02* (2013.01); *A47G 27/0212* (2013.01); *A47G 27/0462* (2013.01); *D05C 17/02* (2013.01); *D06N 7/0065* (2013.01); *D06N 7/0071* (2013.01); *D06N 7/0073* (2013.01); *D06N 7/0076* (2013.01); *D06N 7/0078* (2013.01); *D06N 7/0081* (2013.01); *B32B 37/1284* (2013.01); *B32B 2037/148* (2013.01);
(Continued)

(58) Field of Classification Search
CPC ............. A47G 27/02; A47G 27/0212; A47G 27/0243; A47G 27/0281; D05C 17/02; D06N 7/0005; D06N 7/001; D06N 7/0026; D06N 7/0036; D06N 7/0063; D06N 7/0071; D06N 7/0073; D06N 7/0076; D06N 7/0078; D06N 7/0086; B32B 2037/148; B32B 2471/02
USPC ........... 156/72, 209, 219, 220; 428/95, 96, 97
See application file for complete search history.

(56) References Cited

U.S. PATENT DOCUMENTS 3,669,779 A * 6/1972 Gordon ........................... 156/72
3,684,600 A * 8/1972 Smedberg ....................... 156/93
(Continued)

FOREIGN PATENT DOCUMENTS

EP  0372105 A1 * 6/1990
GB  1220387 A * 1/1971
(Continued)

*Primary Examiner* — Michael Tolin
(74) *Attorney, Agent, or Firm* — Hammer & Associates, P.C.

(57) ABSTRACT

A dimensionally stable floor covering comprises a tufted textile substrate and a reinforcement layer attached to the textile substrate. The reinforcement layer includes an adhesive backing compound and reinforcement fibers surrounded by the adhesive backing. The fibers may form a continuous layer on the back side of the floor covering or may be dispersed within the adhesive backing compound. The adhesive backing compound may be hot water-soluble to facilitate recycling of the floor covering. The floor covering may optionally include additional backing layers (including cushions) and may be used as a broadloom carpet, a carpet tile, or other modular floor covering products. Methods of manufacturing, installing, and recycling the present floor coverings are also provided.

1 Claim, 15 Drawing Sheets

(51) Int. Cl.
*D06N 7/00* (2006.01)
*A47G 27/04* (2006.01)
*B32B 37/12* (2006.01)
*B32B 37/14* (2006.01)

(52) U.S. Cl.
CPC ..... *B32B 2305/188* (2013.01); *B32B 2307/734* (2013.01); *B32B 2471/02* (2013.01); *D06N 2205/14* (2013.01); *D06N 2213/065* (2013.01); *Y10T 156/10* (2015.01)

(56) References Cited

U.S. PATENT DOCUMENTS

| | | | |
|---|---|---|---|
| 4,978,402 A * | 12/1990 | Hallworth | 156/77 |
| 7,351,465 B2 | 4/2008 | Jerdee et al. | |
| 7,803,446 B2 * | 9/2010 | Martz | 428/95 |
| 2002/0039636 A1 * | 4/2002 | Fink et al. | 428/85 |
| 2004/0079467 A1 | 4/2004 | Brumbelow et al. | |
| 2004/0197522 A1 | 10/2004 | Reisdorf et al. | |
| 2005/0037175 A1 | 2/2005 | Loyd et al. | |
| 2007/0224420 A1 * | 9/2007 | Despins | 428/365 |
| 2010/0170991 A1 | 7/2010 | Hobbs et al. | |
| 2011/0039056 A1 * | 2/2011 | Mantle et al. | 428/95 |

FOREIGN PATENT DOCUMENTS

JP 06-343542 A * 12/1994
WO WO 94/02678 A1 * 2/1994

* cited by examiner

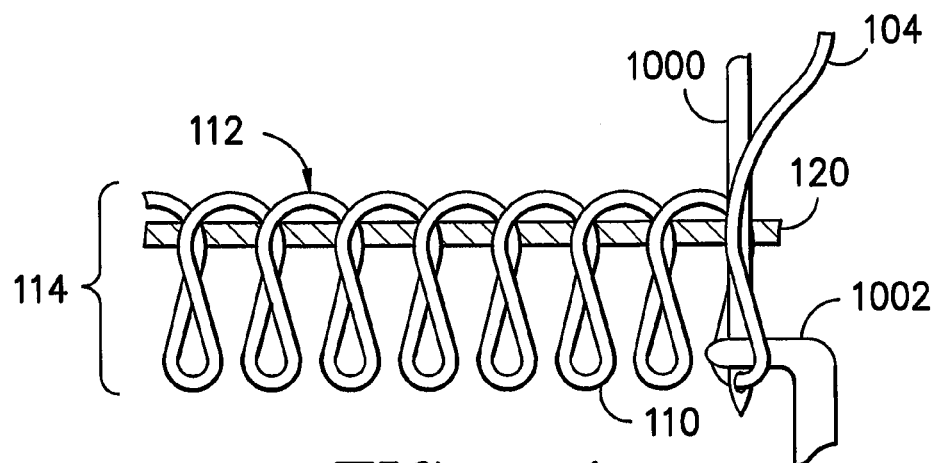
FIG. -1-
PRIOR ART
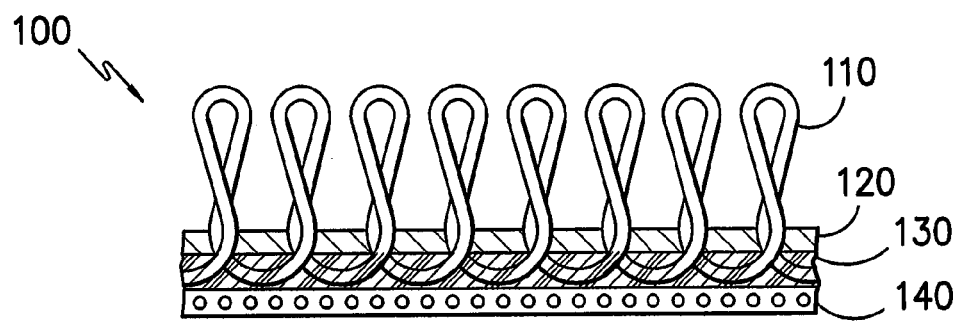
FIG. -2-
PRIOR ART
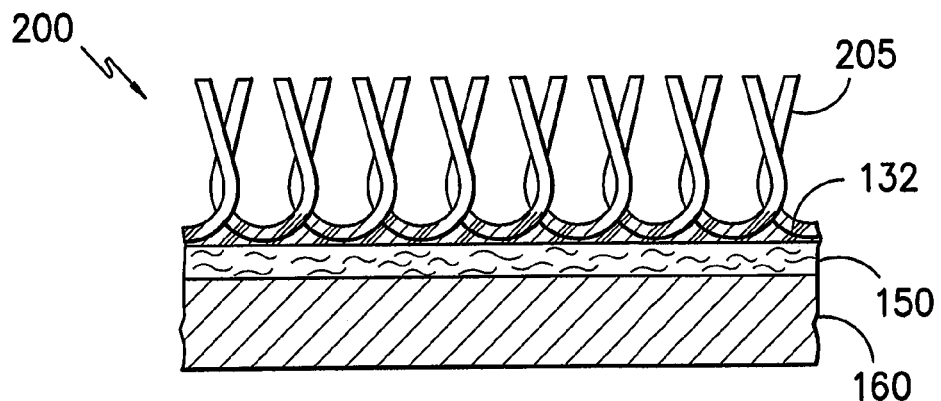
FIG. -3-
PRIOR ART

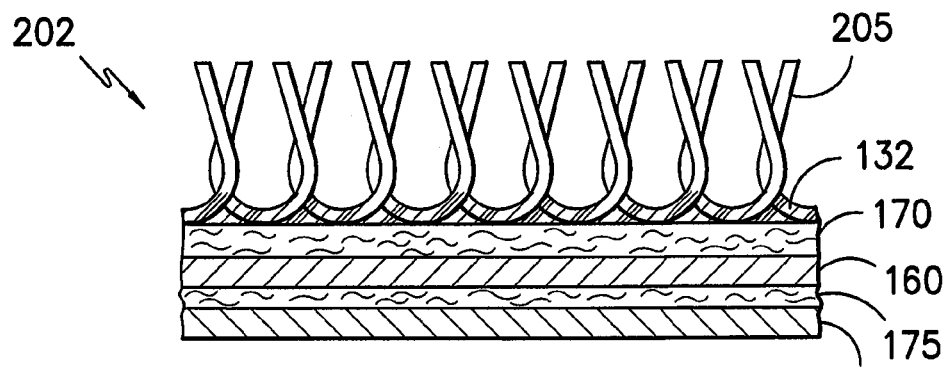
FIG. -4-
PRIOR ART
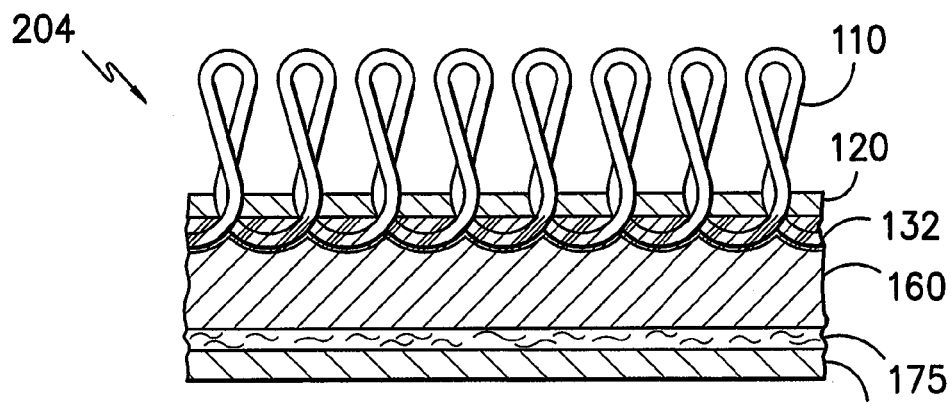
FIG. -5-
PRIOR ART
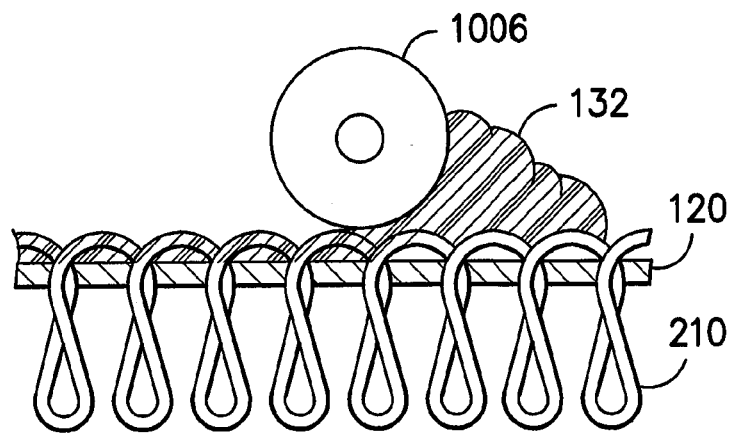
FIG. -6-
PRIOR ART

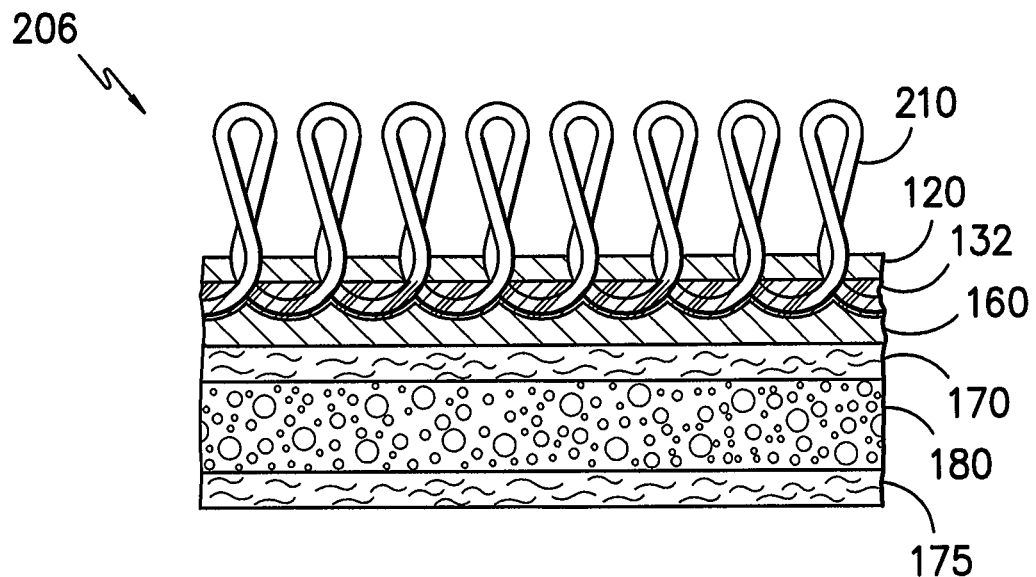
FIG. -7-
PRIOR ART
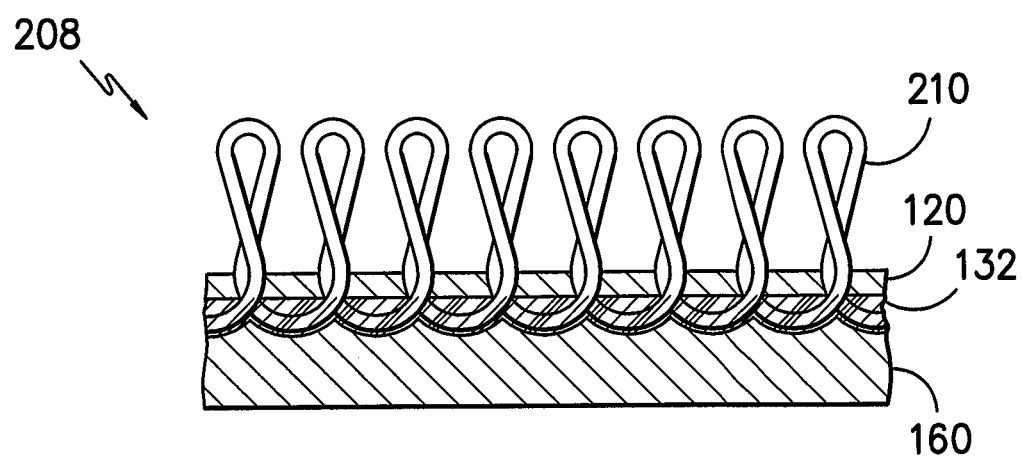
FIG. -8-
PRIOR ART

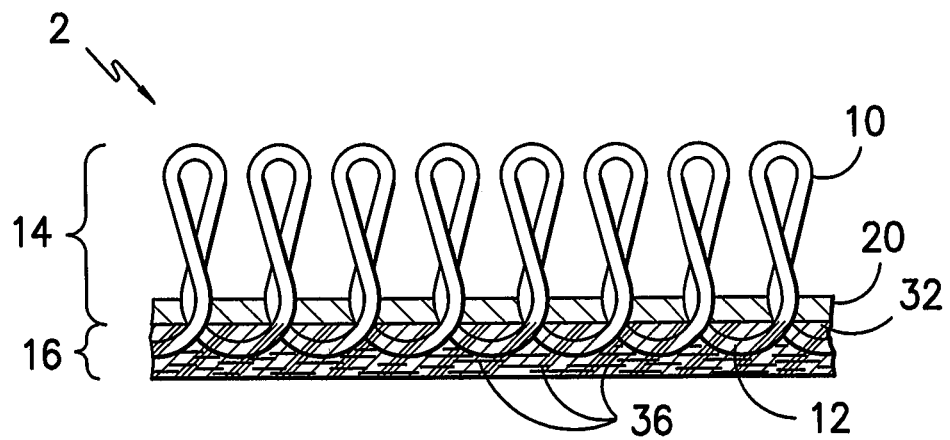
FIG. -9-
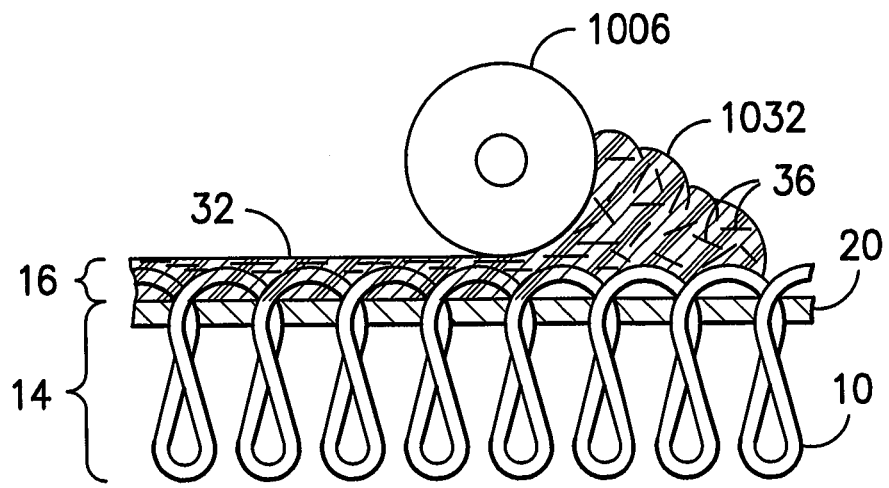
FIG. -10A-

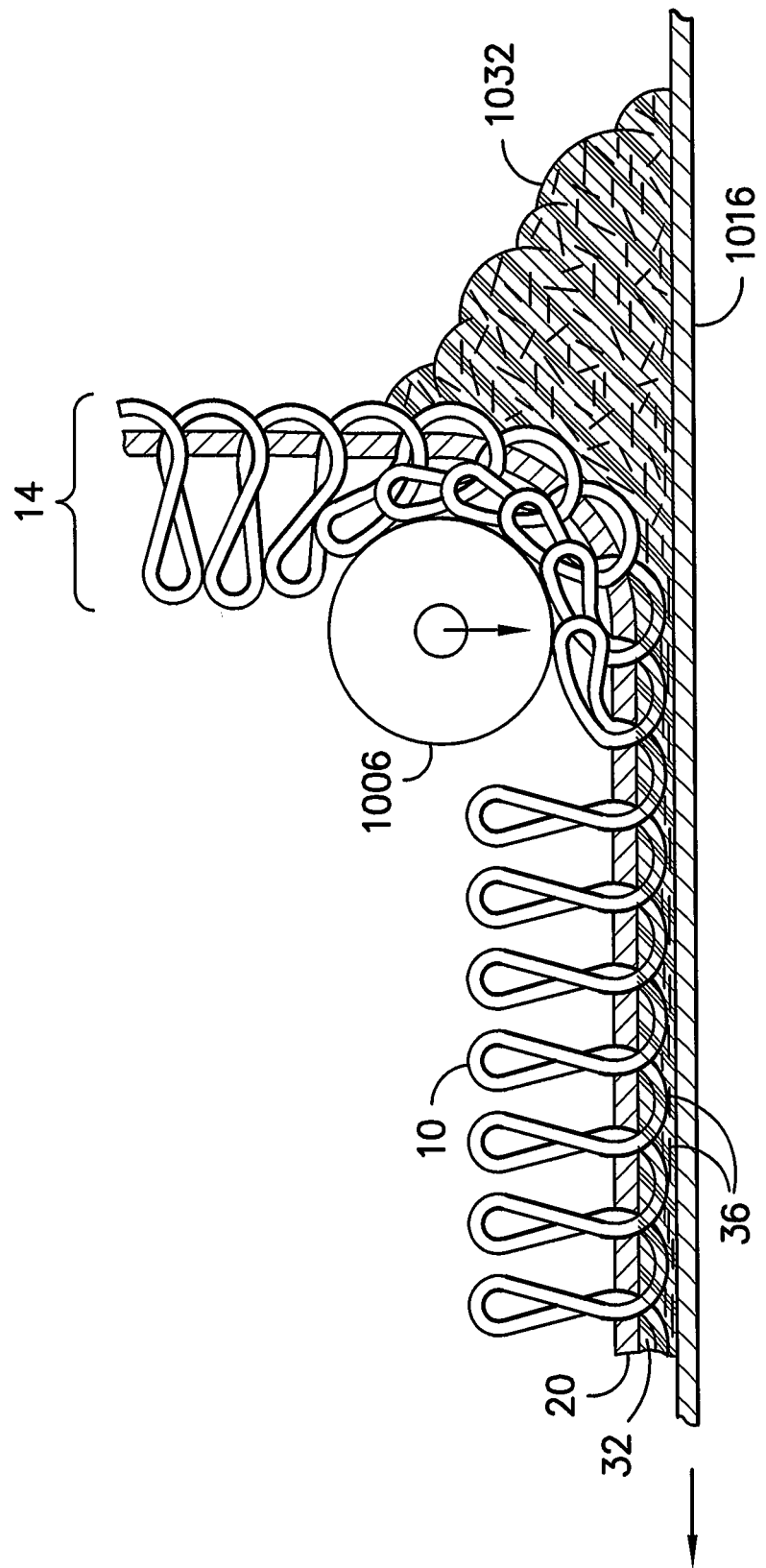

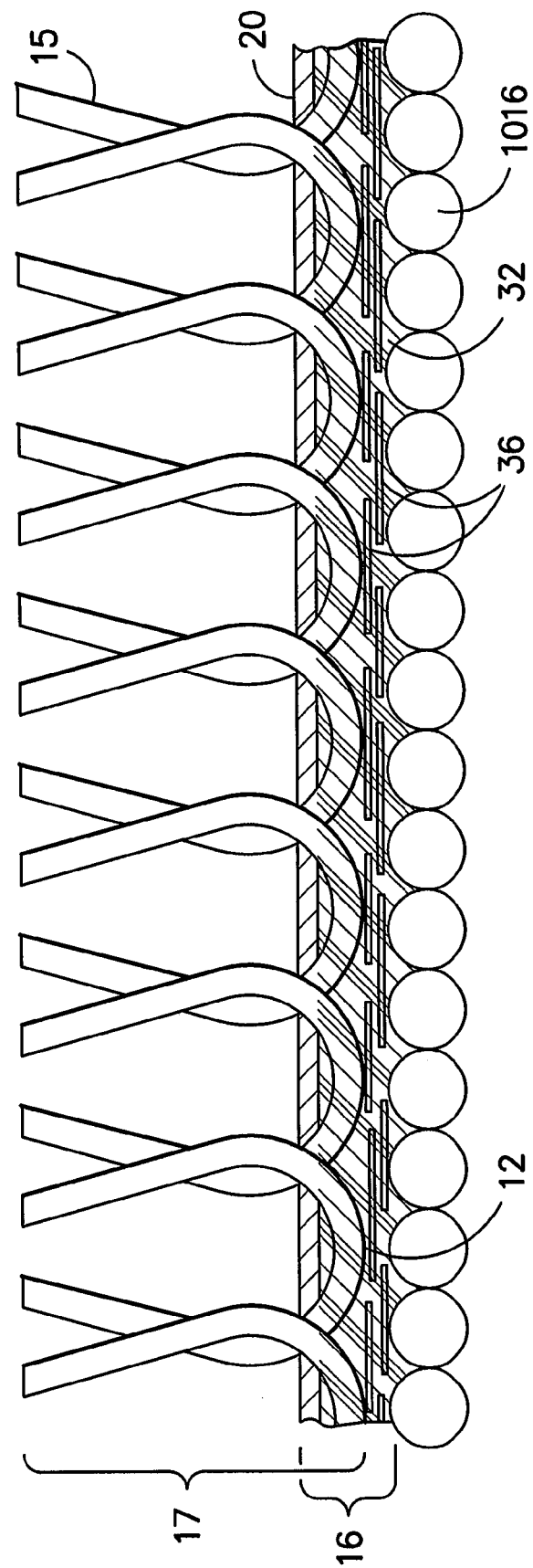
FIG. -10C-

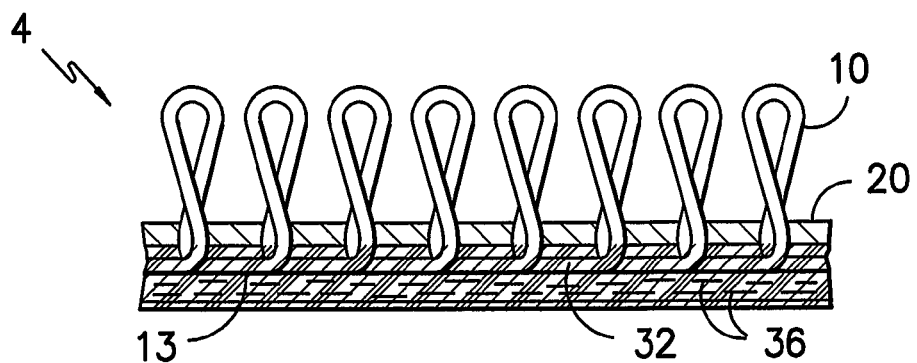
FIG. -11-
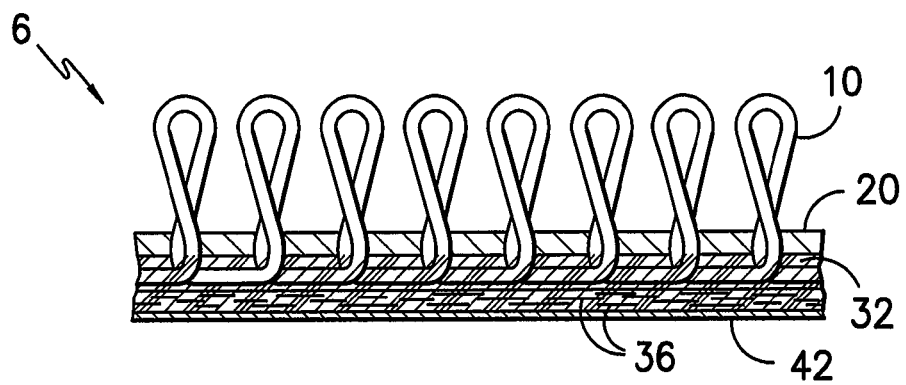
FIG. -12-
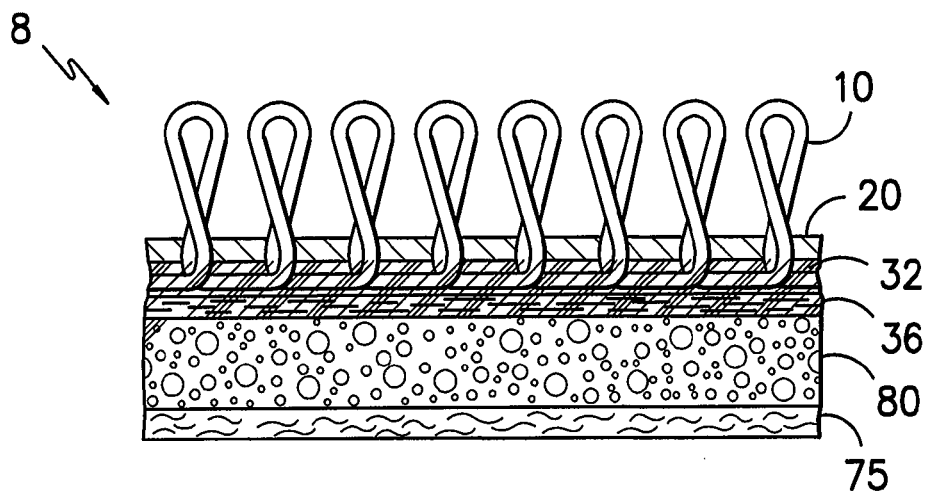
FIG. -13-

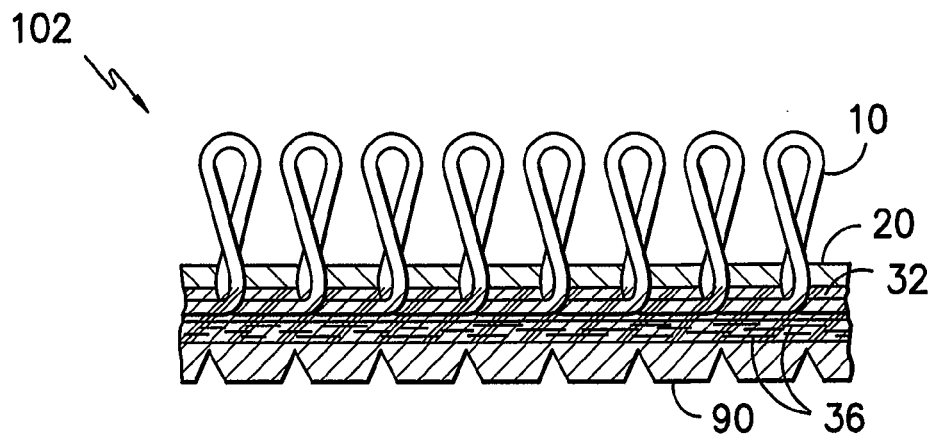
FIG. -14-
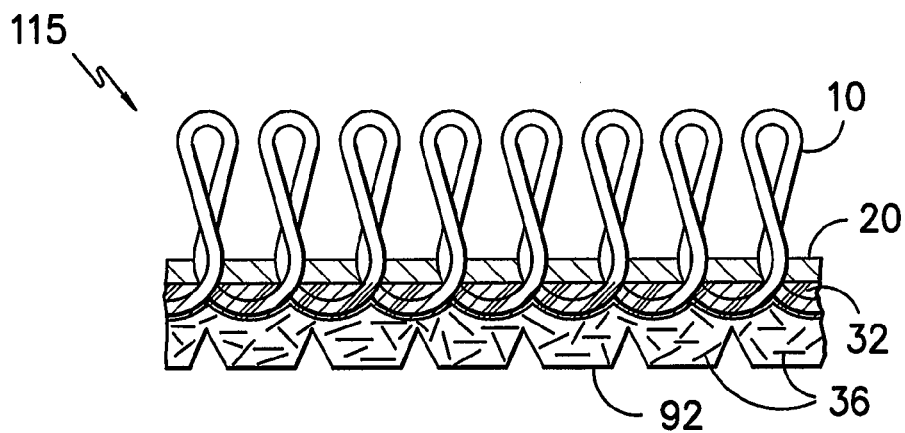
FIG. -15-
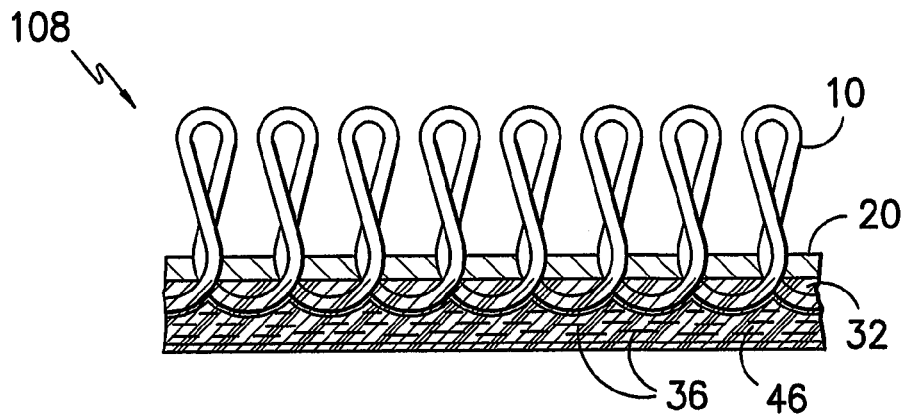
FIG. -16-

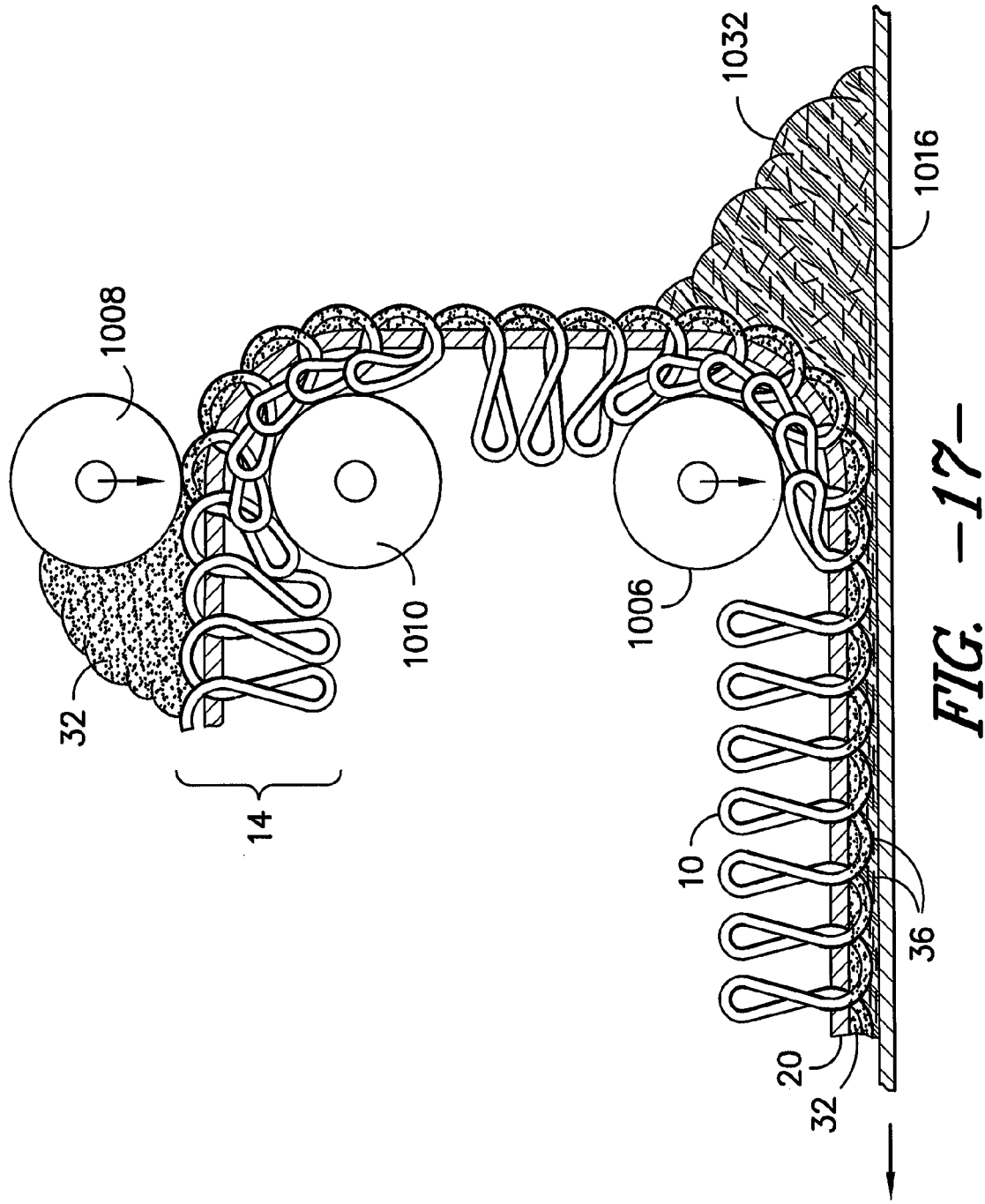
FIG. -17-

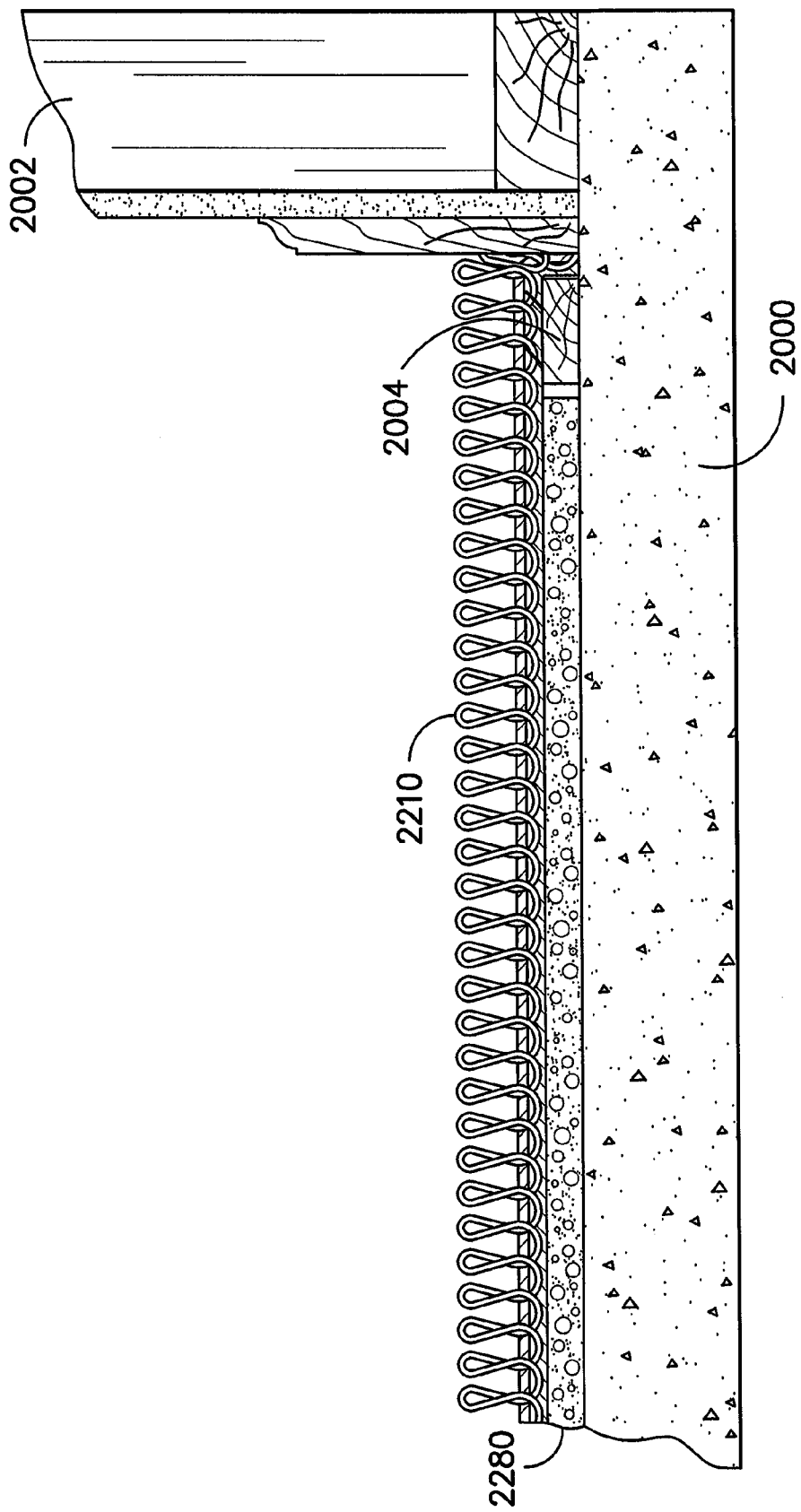
FIG. -18-

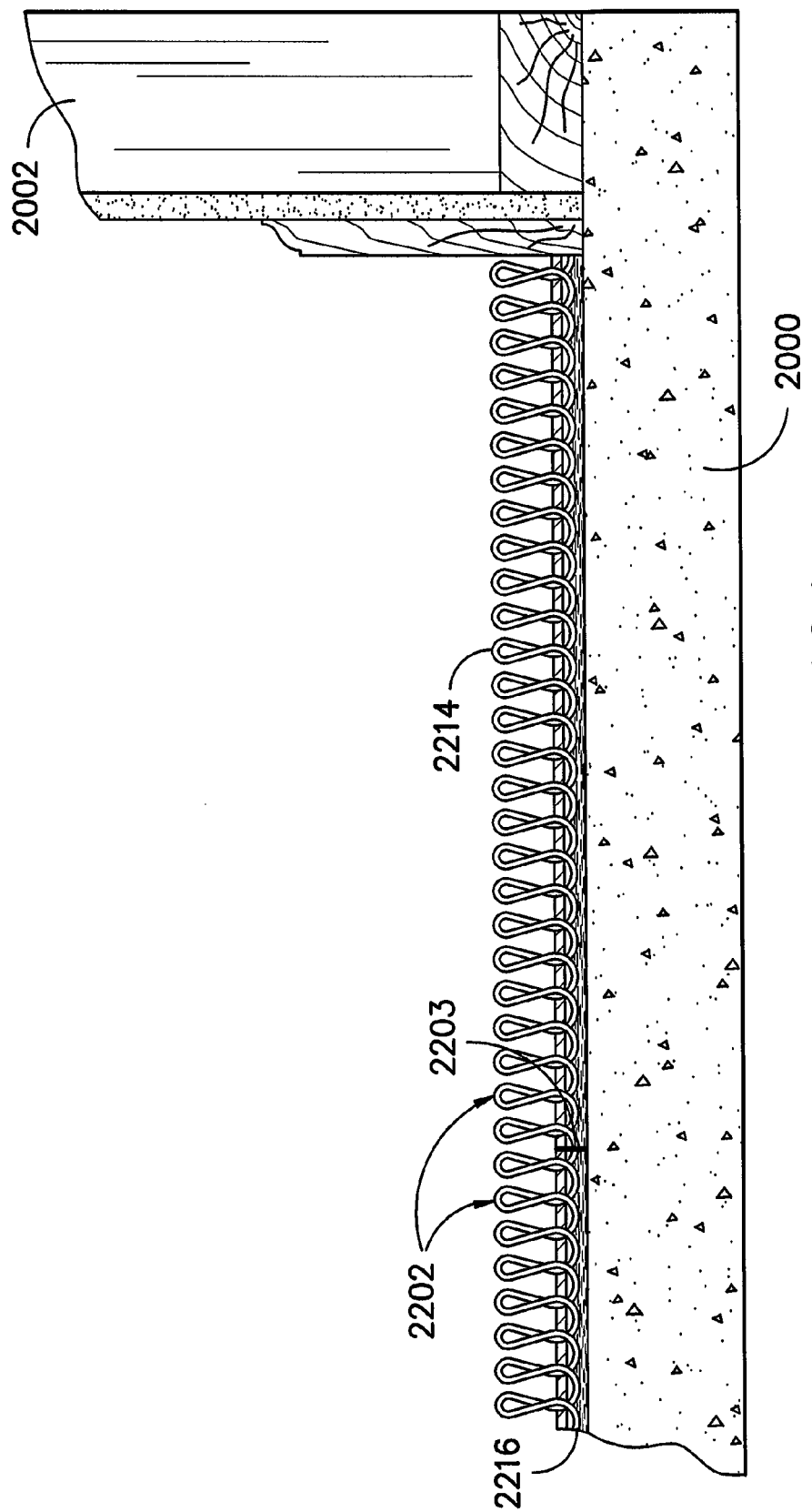

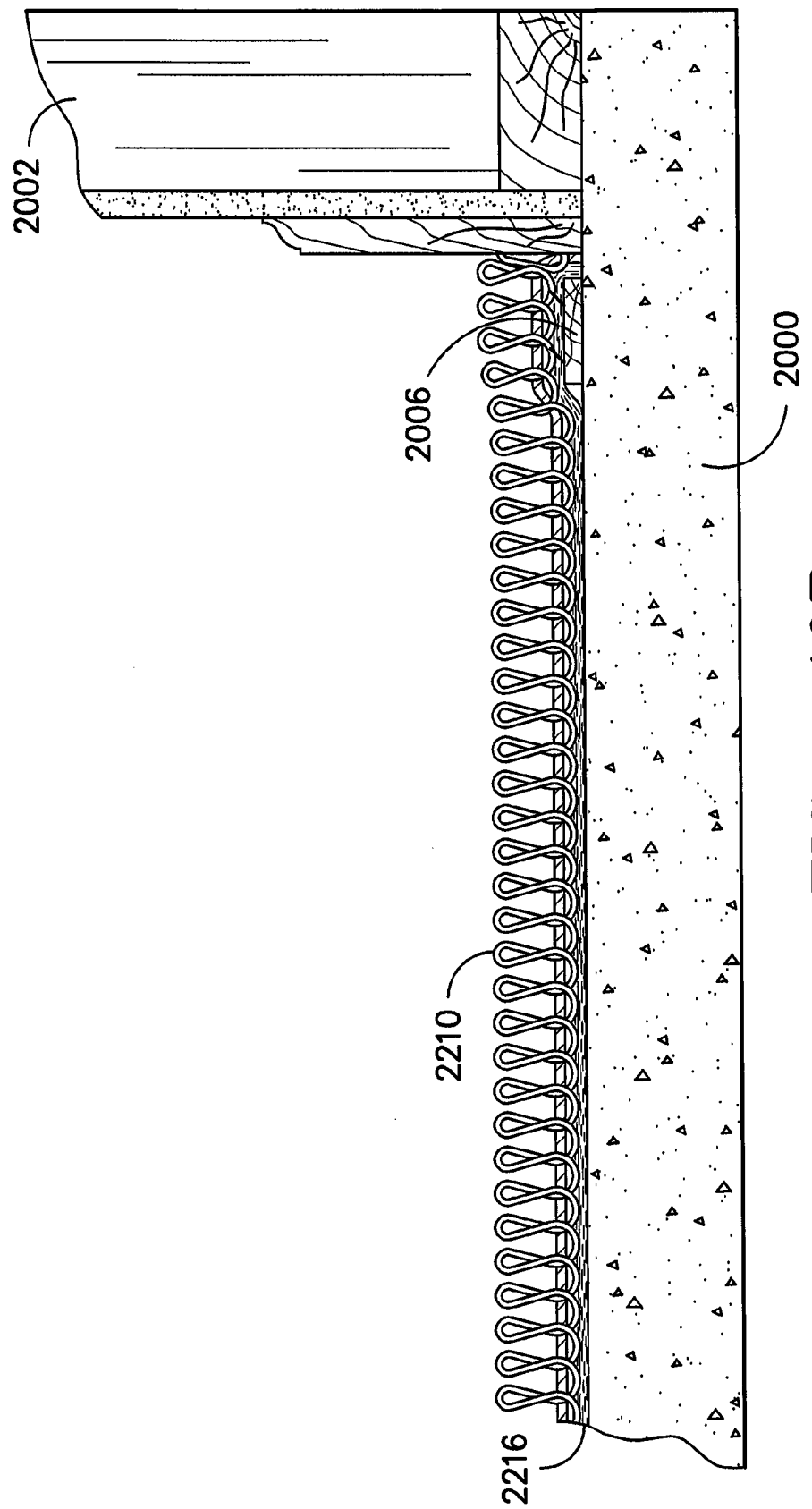
FIG. -19B-

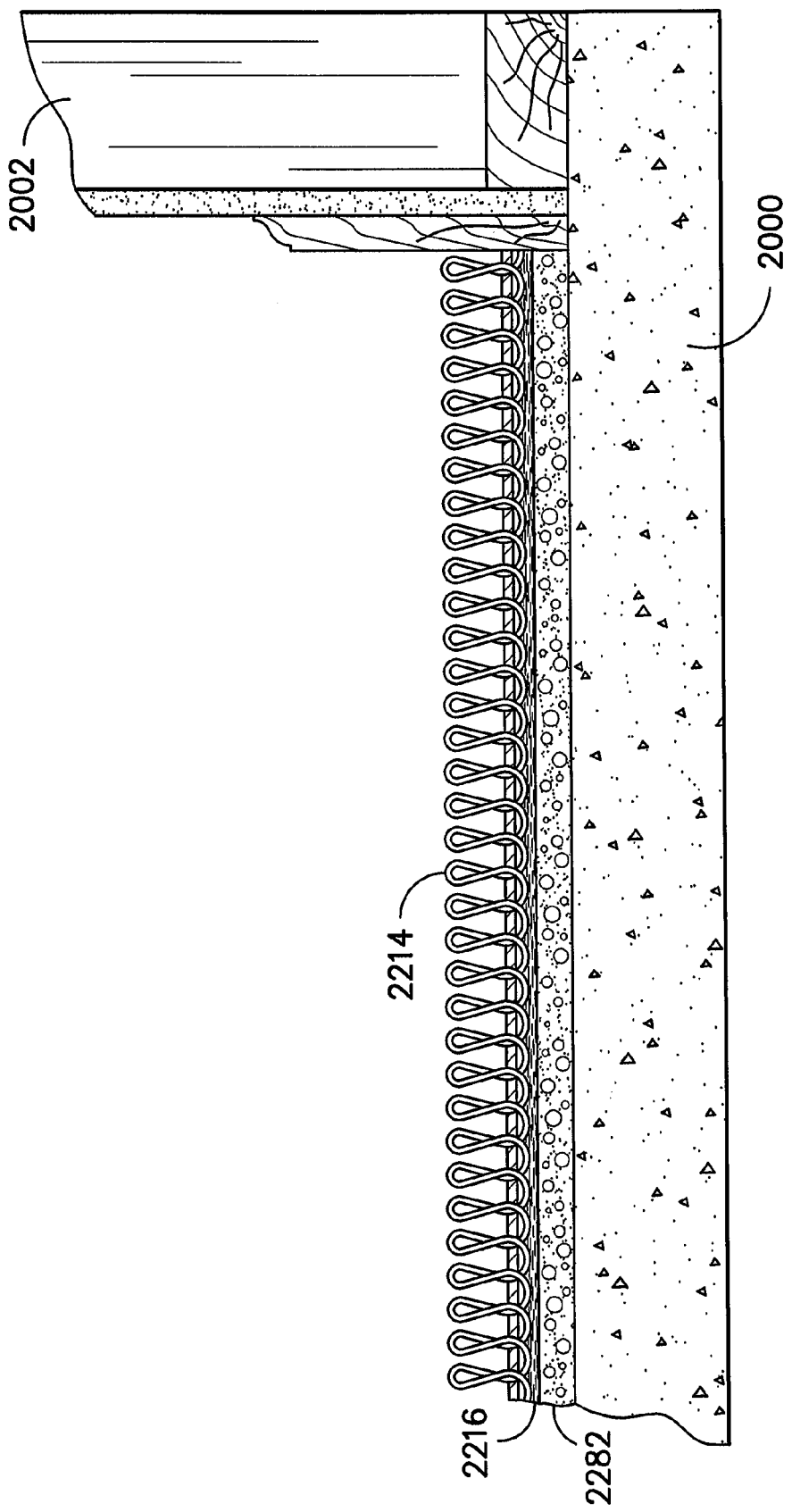
FIG. -19C-

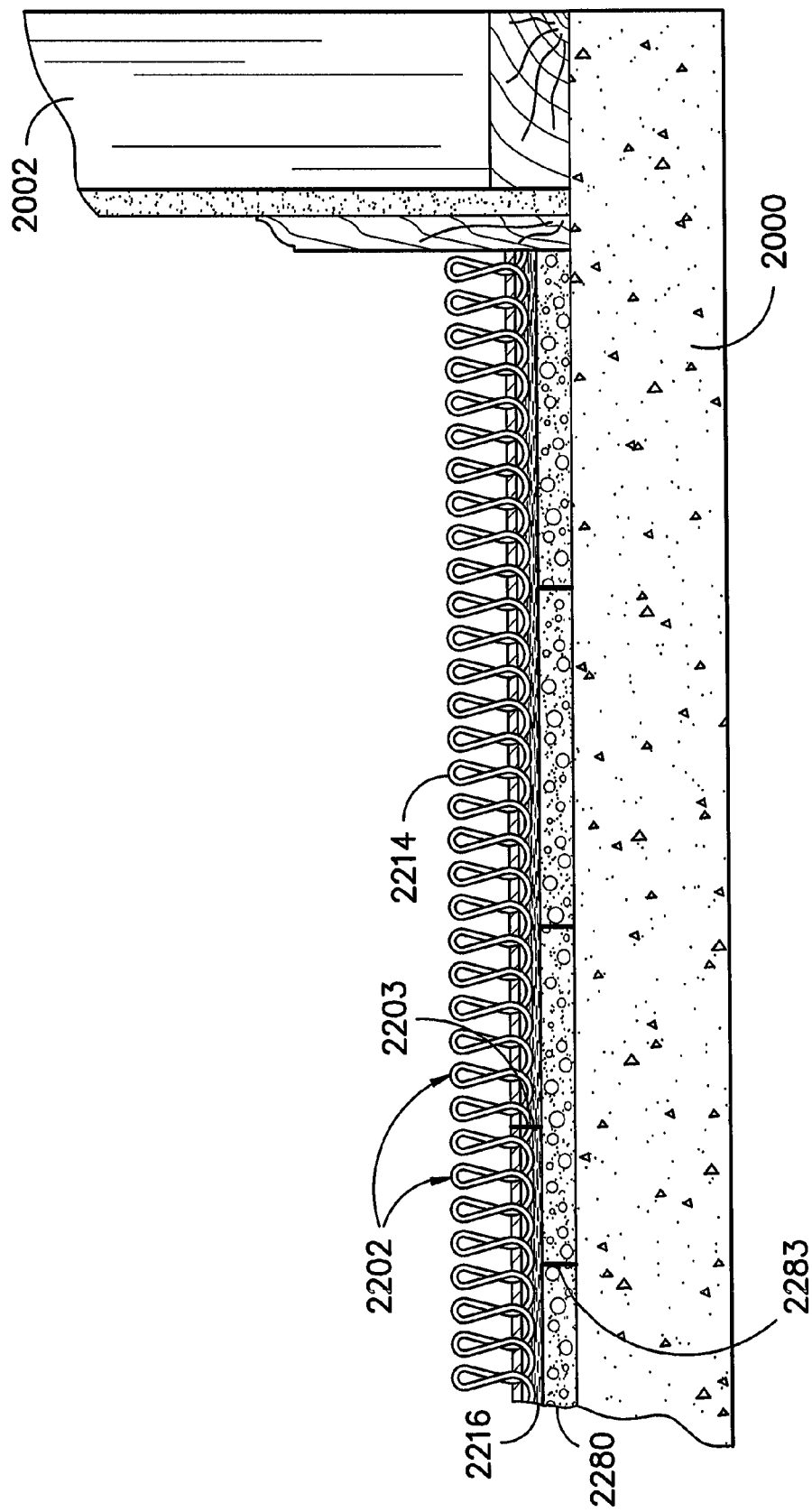
FIG. -19D-

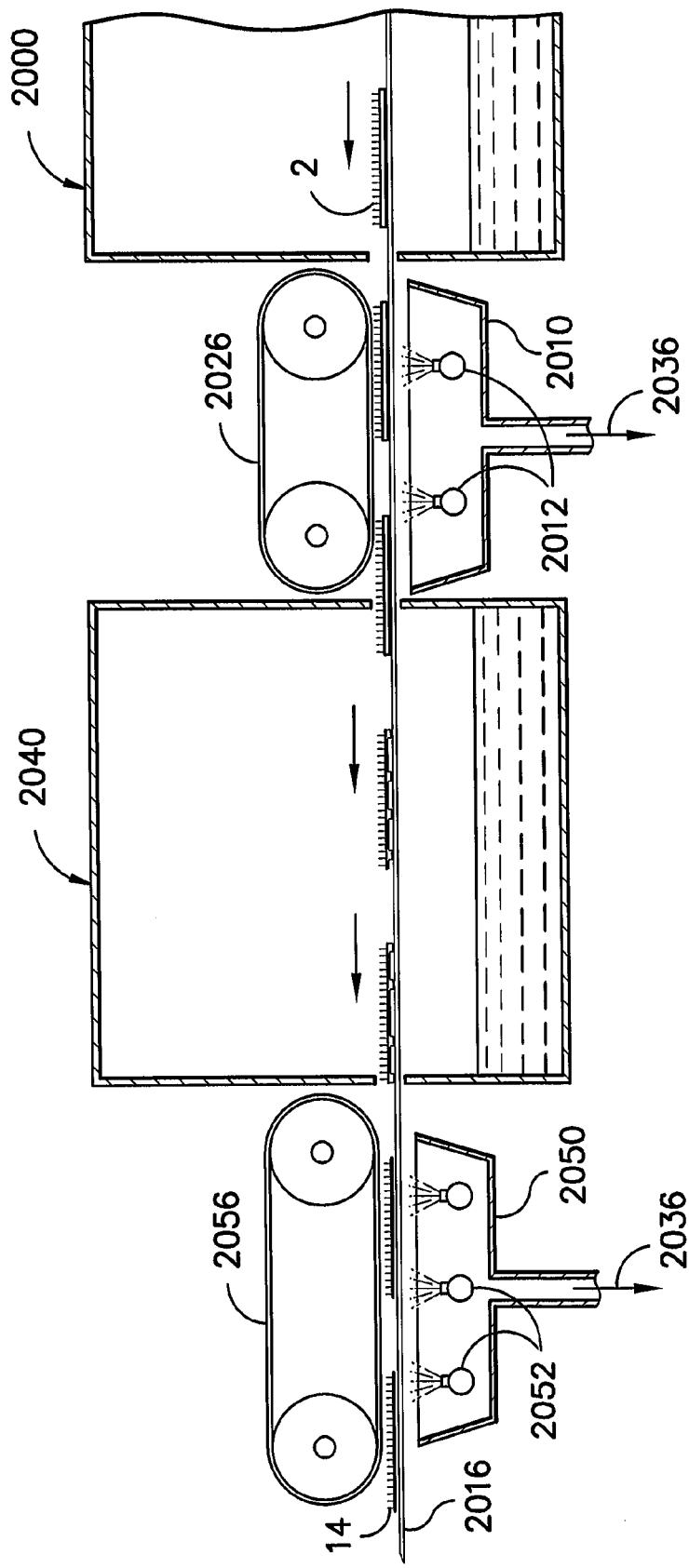
FIG. -20-

FLOOR COVERINGS WITH UNIVERSAL BACKING AND METHODS OF MAKING, INSTALLING, AND RECYCLING

CROSS-REFERENCE TO RELATED APPLICATIONS

The present application is a non-provisional application, claiming priority to U.S. Provisional Patent Application Ser. No. 61/797,496, which was filed on Dec. 10, 2012, the disclosure of which is incorporated by reference herein in its entirety.

TECHNICAL FIELD

The present disclosure is directed to the field of textile floor coverings (such as broadloom carpets and modular carpet tiles) and, particularly, to a textile floor covering with a fiber-reinforced polymer backing. More particularly, according to one or more aspects provided herein, the present disclosure is directed to a floor covering including a tufted textile substrate and a universal backing system and to methods of making, installing, and recycling such a floor covering.

BACKGROUND

With the advent of tufting equipment, floor covering evolved over time from woven carpets to the tufted carpets in use today. Machine tufting began with a single needle, which was similar to a sewing machine. As shown in FIG. 1, a needle 1000 carries a yarn 104 through a primary backing substrate 120, which forms a stitch 112 on the back side adjacent the primary backing substrate 120. On the face side, a looper 1002 holds the yarn 104 to a specified height above the primary backing substrate 120 to form the pile 110 of the carpet. The tufted yarns 110 and the primary backing substrate 120 collectively may be referred to herein as a tufted textile substrate 114.

The single needle configuration progressed eventually to multiple needles operating side-by-side, which is how tufted carpets are made currently. Tufting widths of up to sixteen feet are possible with this equipment, and, when sold at these widths, these carpets are referred to in the industry as "broadloom" carpets. This type of carpet is the preferred flooring material for approximately 90% of residential homes and commercial buildings.

Initially, as the technology to produce broadloom carpet advanced, the only available primary backing substrate 118 was a woven jute material. As a natural fiber, jute is prone to expansion and contraction. Consequently, manufacturers began the practice of coating the jute primary backing substrate 118 with a water-based adhesive 130 and then attaching a secondary backing substrate 140 to form a tufted broadloom carpet 100, as shown in FIG. 2.

Broadloom carpets were traditionally installed in small residential rooms by stretching the carpet over a pad or cushion and attaching the stretched carpet to tack strips attached along the wall (as shown in FIG. 18). Over time and especially with moisture, the jute backing expanded and contracted, causing the carpet to wrinkle or pull off the pins. Further, it was found that the secondary backing could delaminate from the primary textile layer, when the carpet was exposed to wet conditions or stress loadings from foot traffic over the cushion. Although manufacturers began to recognize the need for increased stability in the carpet backings, many of these problems persisted until the introduction of synthetic primary and secondary backings, which reduced, but which did not totally solve, the previously mentioned growth problems.

In preparing to install the broadloom carpet 100, it was often necessary to tape the seams together to obtain a piece of carpet with the desired dimensions. Taping the seams was time-consuming, because the seam tapes included a hot-melt adhesive that must be heated upon application to the carpet to form a joint between adjacent carpet panels. In addition to the difficulties in aligning the adjacent carpet pieces with the seaming tape without wrinkling, the heating of the seam adhesive sometimes caused shrinkage in the secondary backing, especially since the secondary backing was made from a synthetic material. As a result, the seams could buckle, making the installation more difficult. This seam taping procedure for broadloom carpet installations continues to the present time.

About forty years ago, modular carpet products (that is, carpet tiles) were introduced to address some of the problems encountered with the broadloom carpet product described above. Initially, manufacturers attempted to simply cut existing broadloom constructions into modular units. Manufacturers also attempted to create modular products by applying thick polymer layers (without stabilization) to the back of a textile substrate. The primary issue experienced with these attempts was insufficient stability. When these initial product offerings failed, total replacement of the floor covering was required, leading to loss of customer confidence, loss of future sales, and incursion of significant financial loss for the manufacturers.

These initial modular carpets were created using a bonded broadloom product, rather than a tufted carpet. A bonded carpet 200 is made by physically adhering the face yarns 205 to the face side of a primary bonding substrate (150) using a polyvinyl chloride (PVC) adhesive 132, as shown in FIG. 3. Again, woven jute was the first material used as the primary bonding substrate (150) in the bonded carpet 200. As the technology progressed, the jute substrate was replaced with a synthetic bonding substrate 150 to overcome the stability problems discussed above. A heavyweight backing 160 made of polyvinyl chloride was applied directly to the back side of the primary bonding substrate 150 (without a separate reinforcement layer), which permitted the carpet 200 to be cut into individual tiles that could be installed without adhesive (leading manufacturers to coin the term "free lay").

It was required that modular carpet tiles possess sufficient stability to remain in their installed positions on the floor and to remain flat without the edges rising (a phenomenon known as "curling") and without the center rising (known as "cupping"). To meet these objectives, the tiles were typically installed with a grid pattern of adhesive applied to the floor along the perimeters of the tiles. In addition, it was expected that the modular carpet construction would exhibit a high level of dimensional stability and not shrink or expand under use.

Because individual tiles of an installation can be removed and replaced when soiled or worn, modular carpets were useful in applications where broadloom carpets were impractical, such as offices, airports, and other high-traffic areas. The ease with which carpet tiles could be removed proved especially advantageous in facilities with under-floor wiring or HVAC equipment.

While the commercial market enthusiasm for a modular flooring product was even greater than that for broadloom carpets, the initial modular product proved insufficient to meet the needs of the environments in which it was installed. Specifically, as time passed, plasticizers used in the PVC backing (160) began to migrate from the backing layer, causing the backing layer (160) to change in dimension. The tiles began to experience cupping, in which the face side of the carpet tile has a greater dimension than the backing layer and the middle of the carpet tile rises above the floor.

As shown in FIG. 4, the next advancement led to the production of a bonded carpet tile 202 with a dense cut pile 205 and with greater stability. The dense cut pile 205 had no texture imparted to the yarns. To increase the stability of the tile 202, a pre-formed mat of fiberglass 170 replaced the synthetic primary backing substrate 120 (as the surface to which the pile yarns 205 were adhered), and a second mat of fiberglass 175 was embedded between PVC backing layers 160, 165. The "I-beam" construction created by the PVC backing layers 160, 165 and the fiberglass mat 175 prevented the PVC backing layers 160, 165 from shrinking and formed a rigid, fairly inflexible structure. The carpet tiles 202 had to be stacked and boxed for shipping, rather than being rolled onto a tube as was the conventional shipping method for broadloom carpets. An additional issue with manufacturing the carpet tiles 202 was that the critical positioning of the fiberglass 175 between the PVC backing layers 160, 165 required specialized equipment. Thus, due to the high equipment costs, higher material costs, increased product weight, excessive off-quality, and the likelihood of product returns, only a few companies undertook the manufacture of these modular carpet products.

Over time, the demand for the bonded carpet tiles (e.g., 202) decreased, and tufted broadloom constructions were considered for conversion into a modular product. With tufting equipment, both loop piles and cut piles could be produced, with or without texture, and at greater manufacturing speeds than bonded products. Unfortunately, the tufting process could not support the use of pre-formed fiberglass mats (e.g., 170) as a primary backing material. As the tufting needles (1000) penetrated the fiberglass mat, the glass fibers would break, causing the fiberglass mat to rupture and preventing the yarn (104) from forming stitches on the back side of the fiberglass mat.

Accordingly, for tufted modular products 204, as shown in FIG. 5, a synthetic primary backing substrate 120 was used as the tufting substrate for the yarns 210. It was found that, when the synthetic primary backing substrate 120 was a nonwoven mat of polyester or nylon, the yarns 110 were not securely held during processing. As a result, the yarns in the pile could experience "robbing," in which one tuft is shortened or robbed by the next tuft, causing unwelcome variations in pile height. More mending of the yarns was required during tufting, which was made more difficult due to the weakness of the nonwoven mat.

Further, pulled yarns (i.e., yarns not securely held by the nonwoven mat) caused voids in the pile face and defects in the backing application. On occasion, the unsecured yarns could be pulled or snagged during the backing application, leading to the defects described above. The weakness of the nonwoven mat led to weak tuft binds in the final floor covering, as the yarn defects prevent adequate penetration of the adhesive pre-coat composition.

It was also observed that the nonwoven mat itself could lose width (shrink) when pulled through production processes, resulting in a condition known as "neck-down." Finally, even with the problems described above, nonwoven mats are more expensive than "commodity-grade" woven primary substrates.

All of the problems described above with nonwoven primary backing substrates are exaggerated, when the tufting is accomplished using specialty tufting equipment to produce a "graphics tufted" product. In graphics tufting, zigzag stitches and/or multiple "step-over" patterns are employed to obtain color and texture on the face of the floor covering. As a result, graphics tufted textile substrates have two or more yarns stacked on top of each other on the back side of the primary backing substrate, all of the yarns requiring penetration from an adhesive (pre-coat) composition to produce a finished floor covering.

For the reasons described above, manufacturers preferred to use a "commodity-grade" woven primary substrate as the tufting substrate. The most commonly used commodity-grade primary backing substrate was a woven polypropylene material that was designed to hold the yarn stitches tightly during the tufting process. Particularly with graphics tufting, the woven primary backing substrates resulted in a floor covering with greater pattern or design definition, color separation, and texture uniformity than could be achieved with a nonwoven primary backing substrate. Such results were observed because the yarn-holding ability of the woven primary backing substrate permitted more yarns to be located on the face side of the primary backing substrate than on the back side, which not only improved the appearance of the floor covering but also reduced the volume of adhesive composition required to secure the yarns.

This woven polypropylene primary backing substrate 120 was not as thermally stable as the previously used fiberglass backing mat, which led to greater dimensional stability problems (such as curling). Before application of any secondary backing material occurred, it was necessary for the tufted pile substrate (that is, the pile yarns 210 and the primary backing substrate 120) to receive an adhesive coating 132 to secure the yarns 210 in place. The adhesive layer 132 could be made of any polymer type desired by the carpet manufacturer (such as water-based, PVC, hot melts, polyurethanes, and the like). This coating layer 132 was used whether the tufted pile substrate was intended for broadloom or modular carpets. The adhesive layer 132 penetrated into the individual face yarn stitches, both to hold the yarns in position and to prevent the carpet from pilling and/or fuzzing when exposed to foot traffic.

Further shown in FIG. 5, the tufted modular carpet 204 incorporated an "I-beam" reinforcement construction, in which the fiberglass reinforcement mat 175 was positioned between layers of PVC backing layers 160, 165. The fiberglass reinforcement mat 175 was positioned as far as possible from the primary backing substrate 120 supposedly to maximize stability. The PVC backing layer 160 was subsequently secured to the adhesive layer 132.

In the floor covering industry, the adhesive layer (e.g., 132) is referred to as "unitary" if no additional backing layers are to be used and is called a "pre-coat" if additional backing layers are to be applied.

For example, if a broadloom carpet is designed for a direct and permanent gluing to the floor, it could contain only a single adhesive layer on the back side to secure the face yarns. The adhesive layer would then be referred to as a "unitary" coating, signifying that no additional backings are employed. However, this carpet is not stabilized, and the carpet would not perform if not permanently glued to the floor. Predictably, gluing the carpet to the floor makes it very difficult to remove and recycle after its useful life, and removal involves scraping the carpet from the floor.

In most carpet constructions, whether broadloom or modular, the adhesive layer (e.g., 132) functions as a "pre-coat" to which other backing layers may be bonded (as shown in FIG. 5) to prevent the carpet from expanding or contracting during use. The additional backing layers—and the adhesive layer(s) used to bond them together—add weight to the carpet assembly. Specifically, most of the weight in a modular carpet is due to the inclusion of a pre-formed reinforcement layer (e.g., 175) between layers of adhesive backing (e.g., 160, 165), such that the thick polymer layers penetrate and envelop the reinforcement layer.

The curing or cooling of the backing layers 160, 165 requires a long dwell time at high temperature to cure or a long dwell time at ambient temperature to cool, regardless of whether the backing layers 160, 165 are made of PVC, hot-melt compounds, or polyurethane. The curing process necessarily exposes the tufted textile substrate to high temperatures, since lamination of the layers must occur simultaneous with the curing process. Particularly when the primary backing substrate 120 is a woven polypropylene substrate, the heat used to cure the backing layers can cause the synthetic primary backing substrate 120 to shrink, while the polymer backing layers 160, 165 containing the reinforcement layer 175 will not. The differential shrinkage may lead to curling or cupping of the carpet tile and, thus, the carpet tile requires extensive testing prior to shipping.

Although the backing layers 160, 165 are heavy and the resulting product is fairly rigid, the weight of the tile alone is insufficient to overcome any inherent issues with cupping or curling. In fact, the rigidity of the product can prevent the product from being successfully installed on a floor surface if cupping or curling exists, even with the application of installation adhesive between the floor and the carpet product. No amount of adhesive (whether permanent or pressure-sensitive) is sufficient to overcome any inherent cupping or curling in a rigid floor covering. For that reason, modular floor covering that has experienced cupping or curling must be identified as off-quality.

It is known that water-based (or latex) adhesives may be processed at lower temperatures, because curing of the polymer is not required and application of heat is only required for removing water from the adhesive. For this reason and others, most carpet manufacturers prefer to use a water-based adhesive as a pre-coat adhesive layer. Another advantage of latex compositions is that manufacturers can inject air into the latex compositions in a process known as "frothing." The frothing process reduces the weight of the adhesive applied by replacing a portion of the polymer with air bubbles. The weight volume of air in the latex composition allows lower weights to be obtained, resulting in lower manufacturing and shipping costs. In addition to air, filler materials may be added to latex-based adhesives, further reducing costs. Manufacturers have found also that, when using a frothed composition, it is easier to control the penetration of the water constituent in the adhesive into the yarns. The penetration of the adhesive pre-coat can be varied, depending on (a) the viscosity of the adhesive; (b) the pressure of the adhesive applicator roll against the yarns; and (c) the amount of air included in the adhesive, as well as the stitch rate and size of the yarns.

The adhesive used in the pre-coat layer (e.g., 132) must possess a certain viscosity to effectively penetrate the yarns. It has been found that viscosities of between about 3,000 to about 15,000 centipoise (cps) ensure optimum yarn penetration, such that each fiber within the twisted or air-entangled yarn 210 in the pile is contacted by the adhesive. To date, manufacturers have avoided extremely low viscosity adhesives for several reasons. First, extremely low viscosity adhesives tend to have greater penetration into the yarns, which can result in the adhesive bleeding through to the face side of the carpet. This bleed-through can cause a variety of off-quality issues (such as spikes of adhesive that negatively impact the feel of the carpet and color non-uniformity that negatively impacts the appearance of the carpet). Secondly, the adhesives used for carpet applications contain fillers, such as calcium carbonate ($CaCO_2$) and/or alumina tri-hydrate, which can fall out or settle to the bottom of storage vessels in manufacturing, causing variations in application. This problem is even more pronounced in low viscosity adhesives, which lack the inherent thickness to keep these fillers in solution.

The preferred viscosity of the pre-coat adhesive depends on the application method to be used. Most manufacturers use an applicator roll 1006 (sometimes called a "doctor roll") over a plate and allow the tufted textile substrate (120, 210) to be pulled under the roll 1006, as shown in FIG. 6. A puddle of the adhesive 132 forms near the roll 1006, such that a puddle rides on the back side of the substrate. As the tufted textile substrate is pulled under the applicator roll 1006, the hydraulic force increases as the puddle is pulled under the roll, and the contact between the roll 1006 and the back side of the tufted textile substrate 120 forces the adhesive 132 into the yarns 210. The control of the viscosity of the pre-coat adhesive composition is important to ensure the proper penetration of the adhesive into the yarns 210, as discussed above.

The next evolutionary step in the production of modular carpets was the replacement of the PVC backing layer with a hot-melt backing formulation. Hot-melt adhesives (or hot-melt polymers) are thermoplastics applied in molten form, which solidify on cooling to form a hard, durable backing layer. Examples of hot-melt adhesives include, but are not limited to, polyesters, polyamides, polyolefins, polyethylenes, atactic polypropylene, and asphalt-based compounds. Hot-melt polymers are known for their resistance to water and/or solvents.

Initially, manufacturers attempted to create a floor covering (not illustrated) with a hot-melt polymer backing and without a pre-formed reinforcement mat. The floor covering would lie flat without curling or cupping. However, when cut into tiles, the residual force applied to the synthetic primary backing during the hot-melt application caused the tile to lose dimension and to become non-uniformly sized as compared with other tiles. Another problem with the non-reinforced hot-melt floor covering was the "creep" or "cold flow" within the hot-melt layer. That is, forces exerted on the floor covering, such as from office chairs and foot traffic, caused the hot melt backing to expand, leading to tile "growth."

Again, manufacturers turned to the "I-beam" reinforcement construction used previously. The idea of a "free lay" modular carpet installation faded, as even the most stable carpet tiles required at least a grid system of pressure sensitive adhesive to prevent the tiles from moving and from becoming misaligned during installation and use. The adhesive grid also helped to prevent gaps from forming between adjacent carpet tiles.

Facing on-going challenges with tile stability and with adhesive application in the aforementioned grid pattern, installers began applying a full coverage of the flooring adhesive. This full coverage approach was quicker to accomplish than the grid application and became the standard method of installation, which was eventually endorsed by the modular carpet manufacturers. Modular tiles with their heavy backing layers and "I-beam" reinforcement layer remained stiff. The stiffness of the tile had the potential to exert a tremendous amount of force, if not dimensionally stable. As a result, even a full coverage of glue could not hold the tile flat, if it had an inherent tendency to cup or curl.

In addition to overcoming the stability problems described above, modular carpet manufacturers faced other challenges in the manufacturing process:

(1) Thickness and weight variation (side-to-side and/or end-to-end) could result from the uneven application of multiple thick polymer layers. Because tiles cut from one area of processed carpet were routinely installed adjacent tiles from other areas of the processed carpet, consistency in thickness and weight was required to create an installed floor covering of uniform height.

(2) As with broadloom carpets having one or more secondary backing layers, delamination could result from incomplete adhesion between the various layers in the modular tile. Each interface between layers was susceptible to delamination.

(3) Excessive weight was required, since the pre-formed reinforcement layer was positioned between, and penetrated by, polymer coatings. Insufficient penetration had the potential to lead to delamination (as described above). Moreover, because the pre-formed reinforcement layer was fiberglass, complete embedding was necessary to prevent irritation caused by the exposed fiberglass. For modular floor coverings employing an "I-beam" construction, sufficient backing coating layers were needed to ensure the proper spacing of the reinforcement layer.

(4) Creep and cold flow, as discussed above, were experienced in modular tiles having a hot-melt backing system. It was observed that thick coatings tended to expand under high loadings, such as rolling chairs or heavy foot traffic. Conversely, backings made from PVC tended to shrink due to plasticizer migration and exhibited problems with volatile organic compounds (VOCs) and smoke generation.

(5) Recycling of the multiple backing layers, yarns, and the pre-formed reinforcement layer was almost impossible, due to the bonding of the layers and their disparate materials.

(6) Cost was also a significant challenge. In addition to the material costs of the backings, manufacturers faced expensive processing steps, slow production speeds, and high off-quality. As a result, the modular carpet product could cost as much as 50% more than broadloom to produce, which limited its practical use to only specialized commercial installations.

In addition to the problems described above, modular floor coverings had another significant marketing disadvantage, when compared to broadloom carpets, which was the comfort level of the modular floor covering. To address the comfort issue, a cushion layer 180 was incorporated into a cushion-back modular floor covering 206, as shown in FIG. 7. The backing layer 160 was made of a hot-melt polymer compound. The hot-melt compound was applied to the tufted textile backing in a molten state and, upon cooling, achieved lamination of the tufted textile backing to the reinforcement layers. In contrast, when PVC was used as the polymer backing material, it was necessary to pass heat through both the tufted textile substrate and the cushion layer 180 to cure the PVC, which was impractical.

A first "I-beam" construction was created between the primary backing substrate 120 and a first pre-formed reinforcement mat 170. The cushion layer 180 was adhered to the first pre-formed reinforcement mat 170. To protect the cushion layer 180 from tears or abrasion, another pre-formed synthetic reinforcement mat 175 was added, thereby creating a second "I-beam" construction between the reinforcement mats 170, 175. The location of the reinforcement mats 170, 175 was even more critical in accomplishing the desired stability of the floor covering 206. If the mats 170, 175 were misplaced, the processing of the floor covering 206 could cause too much heat on one side of the floor covering 206, resulting in cupping or curling of the finished product. As a result, manufacturers faced considerable issues with off-quality and waste, and returns were common.

Cushion-back tiles 206 experienced many of the same problems described above for "hard-back" tiles and, in some instances, experienced even more problems, including:

(1) Thickness variation and weight were significantly more difficult to control than with hard-back tiles, due to the amount of air incorporated in the cushion layer (180), the consistency with which the cushion layer was applied, and the moisture levels in the foam comprising the cushion layer.

(2) Delamination was a greater problem, since the cushion layer (180) had much less internal strength alone or when joined to another layer and since the polymer used in making the cushion layer was incompatible with most other polymers. Thus, the lamination strength was weaker for the cushion-back modular floor covering 206, as compared with the hard-back floor covering.

(3) Achieving dimensional stability of the cushion-back floor covering 206 was a challenge, due to the incorporation of two pre-formed reinforcement layers 170, 175 in a double "I-beam" assembly. The positioning of each layer 170, 175, bearing in mind its potential for shrinkage, required precise control to produce the desired dimensional stability.

(4) Recycling of cushion-back floor coverings 206 was even more difficult than hard-back floor coverings, because of the inclusion of another layer of disparate polymer material.

(5) Costs associated with producing a cushion-back floor covering 206 were even higher than those seen with a hard-back floor covering. The cushion layer 180 was typically a reactive polyurethane material, which is expensive and is difficult to apply (due to the previously mentioned spacing requirements and expensive specialty equipment required). The cushion layer 180 and its protective reinforcement layer 175, and the associated processing steps, thus contributed to the increased material and production costs for the cushion-back product.

Efforts to dye or color the modular floor coverings 206 with liquid dyes led to more challenges with stability. The dyeing process exposed the floor covering 206 to steam, saturation with water, and excessive heat to dry. These conditions made proper placement of the reinforcement layers 170, 175 in the "I-beam" construction even more critical to control shrinkage of the synthetic backing substrates.

Over time, manufacturers sought to apply the components of modular construction to broadloom carpets with the objective of facilitating rolling traffic across the carpet. By using a broadloom product, manufacturers tried to eliminate the risk of water penetration through the seams and the textile face of a modular floor covering installation.

An exemplary broadloom carpet is illustrated as floor covering 208 in FIG. 8. A tufted textile substrate, having a yarn pile 210 tufted through a primary backing substrate 120, was used as the face of the floor covering 208. The stitch portions of the yarns 210 were secured by a pre-coat adhesive application 132. A polymer backing 160 was applied to form the backing of the floor covering 208.

Because broadloom carpets are shipped in rolls, the material of choice for the polymer backing 160 was PVC, which was more flexible than the stiff hot-melt adhesives and/or bulky cushion layers used in modular products. However, because this polymer backing was heavy, the resulting product was difficult to ship and to install, leading to a reduction in shipped widths from 12 to 15 linear feet to only 6 linear feet. The pre-formed reinforcement layer used in modular constructions (e.g., 170) was omitted to promote the flexibility of the carpet, which destroyed the stabilizing "I-beam" construction. This removal of the "I-beam" construction led to stability problems in the finished carpet, which could only be counteracted by permanent adhesion to the floor.

As discussed above, PVC polymer backings create a hard backing surface. To achieve the comfort level expected from broadloom carpets, some PVC-backed broadloom floor coverings 208 were provided with an additional cushion layer attached to the PVC backing layer 160 (not shown). In these cases, there were only a limited number of cushion options available from the manufacturer, and, with the addition of another layer, manufacturers faced many of the same stability challenges and off-quality issues described above.

In other cases, secondary-backed broadloom floor coverings 208 were glued over a specialized cushion pad that was glued to the floor using a "double-stick" technique. The specialized cushion pads were designed to minimize adhesive penetration into the cushion. The double-stick approach allowed the consumer to have more options over the thickness of the cushion and, thus, the comfort level of the floor covering. However, this installation method was expensive and time-consuming. Moreover, the installation was permanent and difficult to remove. As a result, this approach was typically restricted to commercial settings with larger open spaces, where stretching the broadloom floor covering was impractical due to room size.

As is evident from the discussion above, floor covering manufacturers have encountered substantial challenges in designing a floor covering that is stable in production and installation. These challenges have led to a large number of specialized carpet backing constructions and necessary processing equipment. Thus, a universal reinforcing backing layer, such as that described herein, which could be applied to both broadloom and modular floor coverings, would represent a significant advance in the floor covering industry.

Another consideration left wholly unsatisfied by existing floor coverings is the ability to recycle the floor covering. Because the floor coverings described above often included many layers of different polymer types, separating the floor coverings into useful streams of the component materials has been virtually impossible. For this reason, the majority (approximately 95%) of floor coverings disposed of annually in the United States are landfilled or incinerated.

One attempt at recycling carpet that was tried was grinding the entire floor covering and reforming the ground components into a new layer, either with compression or partial melting of the thermoplastic components and encapsulation of the thermoset components. This new layer of recycled materials was then embedded within another backing compound, such as the backing layer, to add weight to a virgin modular carpet. Even after the purchase of expensive equipment to facilitate material reuse, manufacturers experienced difficulties in controlling the assembly and realized high levels of off-quality product.

Therefore, an improved backing layer of lower cost that would facilitate recycling, while maintaining the requisite dimensional stability, would also represent an advance in the floor covering art. Such a backing layer is provided herein, as are methods of manufacturing, installing, and recycling the present floor coverings including the inventive backing layer.

SUMMARY

As disclosed herein, a dimensionally stable floor covering is provided with a universal fiber-reinforced backing. The floor covering may be used as a broadloom product or as any of a variety of modular products, including without limitation, carpet tiles, area rugs, runners, and stair coverings. Methods of manufacturing, installing, and recycling the present floor coverings are also provided herein.

Specifically, the dimensionally stable textile floor covering includes a tufted textile substrate and a reinforcement layer attached to the back side of the tufted textile substrate. The tufted textile substrate includes a primary backing substrate having a face side and a back side opposite the face side; and a plurality of yarns tufted through the primary backing substrate, a portion of each yarn forming a stitch located on the back side of the primary backing substrate. The reinforcement layer includes an adhesive composition and a plurality of fibers, wherein the fibers are encased by the adhesive composition and form a fiber-reinforced layer on the back side of the primary backing substrate. The stitch portions of each yarn are penetrated by the adhesive composition.

A method of manufacturing a dimensionally stable floor covering is also provided. The manufacturing method includes: providing a tufted textile substrate including a primary backing substrate and a plurality of yarns tufted through the primary backing substrate, the primary backing substrate having a face side and a back side opposite the face side and a portion of each yarn forming a stitch located on the back side of the primary backing substrate; applying a fiber-containing adhesive composition to the back side of the primary backing substrate, causing the fibers contained in the adhesive composition to be encased in the adhesive composition, thereby forming a continuous reinforcement layer on the back side of the primary backing substrate; and curing the adhesive composition.

The present disclosure also provides a method of installing a dimensionally stable floor covering, according to the teachings herein. The installation method includes: (a) providing a dimensionally stable floor covering, the floor covering comprising a tufted textile substrate comprising a backing substrate having a face side and a back side opposite the face side; and a plurality of yarns tufted through the primary backing substrate, a portion of each yarn forming a stitch located on the back side of the primary backing substrate; and a reinforcement layer comprising an adhesive composition and a plurality of fibers, wherein the fibers are encased by the adhesive composition and form a fiber-reinforced adhesive layer on the back side of the primary backing substrate and the stitch portion of each yarn are penetrated by the adhesive composition; (b) measuring the floor covering to fit dimensions of a room in which the floor covering is to be installed; (c) cutting the floor covering to fit the dimensions of the room; and (d) laying the floor covering in the room.

Finally, a method of recycling the present floor covering is contemplated herein. In this aspect, the floor covering includes a tufted textile substrate comprising a primary backing substrate having a face side and a back side opposite the face side; and a plurality of yarns tufted through the primary backing substrate, a portion of each yarn forming a stitch located on the back side of the primary backing substrate; and a reinforcement layer comprising a hot water soluble adhesive composition and a plurality of fibers, wherein the fibers are encased by the adhesive composition and form a fiber-reinforced layer on the back side of the primary backing substrate and the stitch portions of each yarn are penetrated by the adhesive composition. The recycling method includes: (a) conveying the floor covering through a steam chamber, in which the floor covering is exposed to steam; (b) directing high pressure streams of steam from a plurality of steam nozzles toward the reinforcement layer of the floor covering, thereby dissolving the hot water soluble adhesive composition; (c) repeating steps (a) and (b) as needed to fully dissolve the adhesive composition; and (d) collecting the dissolved adhesive/reinforcement fiber composition.

These and other features, aspects, and advantages of the present products and methods will become better understood with reference to the following description and appended claims. The accompanying drawings, which are incorporated herein and which constitute a part of the present specification, illustrate various embodiments of the invention and, together with the written description, serve to explain the principles of the inventive products and methods.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 1 is a cross-sectional view of a tufting needle producing a tufted carpet, according to the prior art;

FIG. 2 is a cross-sectional view of a tufted broadloom carpet, according to the prior art;

FIG. 3 is a cross-sectional view of a bonded modular carpet, according to the prior art;

FIG. 4 is a cross-sectional view of an alternate bonded modular carpet, according to the prior art;

FIG. 5 is a cross-sectional view of a tufted modular carpet, according to the prior art;

FIG. 6 is a schematic diagram of an equipment arrangement for applying an adhesive layer to a tufted textile substrate, as shown in FIG. 5, the equipment arrangement being according to the prior art;

FIG. 7 is a cross-sectional view of a tufted modular carpet having a cushion layer, according to the prior art;

FIG. 8 is a cross-sectional view of a tufted broadloom carpet with a "modular-like" construction, according to the prior art;

FIG. 9 is a cross-sectional view of a tufted floor covering, according to the present disclosure;

FIG. 10A is a schematic diagram of an equipment arrangement for applying an adhesive layer and reinforcing fibers to a tufted textile substrate, as may be used in the production of the inventive floor covering products described herein;

FIG. 10B is a schematic diagram of an alternate equipment arrangement for applying an adhesive layer and reinforcing fibers to a tufted textile substrate, as may be used in the production of the inventive floor covering products described herein;

FIG. 10C is a close-up of a portion of the schematic diagram of FIG. 10B, but in which a cut pile textile substrate is used instead of a loop pile textile substrate;

FIG. 11 is a cross-sectional view of an alternate tufted floor covering, according to another aspect of the present disclosure;

FIG. 12 is a cross-sectional view of yet another alternate tufted floor covering, according to yet another aspect of the present disclosure;

FIG. 13 is a cross-sectional view of another alternate tufted floor covering containing a cushion layer, according to another aspect of the present disclosure;

FIG. 14 is a cross-sectional view of a further alternate tufted floor covering, according to a further aspect of the present disclosure;

FIG. 15 is a cross-sectional view of a still further alternate tufted floor covering, according to a still further aspect of the present disclosure;

FIG. 16 is a cross-sectional view of another tufted floor covering with a fiber-containing polymer backing layer, according to another aspect of the present disclosure;

FIG. 17 is a schematic diagram of an equipment arrangement for producing the floor covering of FIG. 16;

FIG. 18 is a schematic representation of a stretched broadloom floor covering installation in a residential setting, according to the prior art;

FIG. 19A is a schematic representation of a "floating" installation of the present floor covering, according to a first aspect of the present disclosure;

FIG. 19B is a schematic representation of an installation of the present floor covering with a tack strip, according to a second aspect of the present disclosure;

FIG. 19C is a schematic representation of an installation of the present floor covering with a cushion backing, according to a third aspect of the present disclosure;

FIG. 19D is a schematic representation of a modular installation of the present floor covering, according to yet another aspect of the present disclosure; and FIG. 20 is a schematic diagram of an equipment arrangement for recycling the tufted floor coverings described herein.

The cross-sectional views depicted in the FIGURES are views taken along the machine direction of the product (i.e., in the direction along which the carpet product is tufted and coated).

DETAILED DESCRIPTION

Reference will now be made in detail to embodiments of the inventive products and methods, one or more examples of which are illustrated in the drawings. Each example is provided by way of explanation of the invention, not limitation of the invention. In fact, it will be apparent to one of ordinary skill in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as fall within the scope of the appended claims and their equivalents.

FIG. 9 illustrates the present floor covering 2, according to a first aspect herein. The floor covering 2 includes a tufted textile substrate 14 made of yarns 10 tufted through a primary backing substrate 20. The yarns 10 form stitches 12 on the back side of the primary backing substrate 20. A reinforcement layer 16 contains an adhesive composition 32 and a plurality of fibers 36 encased by the adhesive composition 32 and producing a continuous fiber layer on the back side of the tufted textile substrate 14. The adhesive composition 32 penetrates the stitch portions 12 of the yarns 10, thereby connecting the reinforcement layer 16 to the tufted textile substrate 14. In this aspect, the adhesive composition 32 functions simultaneously as a pre-coat (in binding the stitches 12) and a backing polymer (in forming the floor-contacting surface of the floor covering 2).

While the yarns 10 are shown as forming a loop pile, it should be understood that the yarns 10 may instead be cut to produce a cut pile (as shown in FIG. 10C), as is known in the art. The yarns 10 are synthetic materials, such as nylon, polyester, polypropylene, and acrylic.

The primary backing substrate 20 is generally a woven or nonwoven textile material made of synthetic fibers and/or yarns, such as nylon, polyester, or polypropylene. One potentially preferred primary backing substrate 20 is a woven polypropylene substrate described in the industry as a "commodity-grade" primary backing. One commercially available commodity-grade primary backing is sold by Propex, Inc. of Chattanooga, Tenn., under the trademark POLYBAC® (for primary carpet backings). Another example of a primary backing substrate is known as a "fiber-lock-weave" (FLW) substrate that is produced by needle-bonding. In one aspect, to facilitate recycling, the yarns 10 and the primary backing substrate 20 are made from the same polymer. In this or other aspects, the primary backing substrate 20 may be made from a polymer dissolvable in hot water.

Some tufted textile substrates 14 may benefit from a "heat-relaxing" step before the application of the fiber-reinforced adhesive layer 16. This heat-relaxing step, which is typically performed at temperatures and for durations greater than those expected to be seen during adhesive application and curing, allows the uncoated textile substrate 14 to shrink as much as possible in both the machine and cross-machine directions. The objective of the heat-relaxing step is to release any built-in tensions that may have occurred during tufting. The heat-relaxing step also relaxes the yarns 10 to prevent excess shrinkage during the curing and/or cooling of the adhesive 32.

The present constructions and manufacturing methods, as described herein with reference to FIGS. 10A through 10C and FIG. 17, allow the reinforcement fibers 32 to float in the adhesive composition until the composition cures and to form a continuous fibrous layer in close proximity to (or contact with) the tufted textile substrate 14. As a result, even commodity-grade primary backings may be used without the problems associated with shrinkage of the primary backing. The commodity-grade primary backing substrates may be used to manufacture all carpet types, including modular carpet tiles. By permitting the same primary backing substrate to be used for all types of floor covering products, manufacturers are able to simplify their manufacturing processes and to reduce their raw material inventories.

Because the reinforcing fibers 36 are applied in an uncured adhesive composition 1032, the positions of the fibers 36 within the adhesive backing layer 32 may shift in response to any shrinkage of the primary backing substrate 20 that occurs. It is also believed that the proximity of the reinforcing fibers 36 to the primary backing substrate 20 helps to counteract shrinkage, especially latent shrinkage.

Additionally, because the polymers are of lower weight and are more inert to internal forces, the greater flexibility of the polymers used in the reinforcement layer 16 significantly reduces the likelihood that the floor covering 2 will curl or cup. Consequently, the floor covering 2 conforms to the floor. The flatness, or planarity, of the floor covering 2 allows the installation adhesive, if used, to function more efficiently.

While not wishing to be bound by any theory of operation, it is believed that that the unique attributes of the invention described herein may be obtained by: 1) A portion of the pure (non-fibrous) adhesive is pushed away from the fibers and into the voids around and into the yarns of the carpet substrate which adds to the performance of the carpet substrate yarns and allows lamination of the reinforcement fibers. This is achieved by "filtration" and a bridging of the reinforcement fibers with the carpet substrate yarns acting as the filtration media and the length of the reinforcement fibers bridging over the spacing between the carpet substrate yarns. 2) A portion of the pure adhesive remains within the reinforcement fibers to bond the fibers together, forming a wet laid non woven reinforcement layer directly bonded to the carpet substrate. Lastly, If 1 and 2 above are then placed on a textured surface such as a belt or patterned roll and cured in that position excess adhesive will flow from the previously applied adhesive/reinforcement fiber into the voids of the pattern to form a decorative and protective cover for the reinforcement fiber layer. This will occur with gravity and the natural tendency of the adhesive to move toward the heated surface.

The present invention disperses reinforcement fibers 36 into the adhesive composition 32 to form the reinforcement layer 16 of the floor covering (e.g., 2). Preferably, the fibers 36 are made of glass, which is known to impart maximum stability to any substrate. The glass fibers 36 may be of any diameters and lengths, and fibers of different diameters and/or lengths may be used within the same reinforcement layer 16 of the floor covering, if so desired. By way of example and not limitation, one potentially preferred diameter is described as "size E," and one potentially preferred length is about 0.25 inches. Glass is most unaffected by environmental conditions (e.g., temperature, humidity) and carpet processing conditions and is inert to most chemicals. Natural or synthetic fibers may be used instead of, or in addition to, glass fibers, although such fibers are generally not as stable to heat or moisture as glass fibers. Mixtures of different fiber types or blends of different fiber types (e.g., yarns blended together) may also be used.

The adhesive backing composition 32 may be made of polyvinyl chloride (PVC) hot-melt or a polyurethane. According to one aspect described herein, the adhesive backing composition 32 is water-soluble in hot water or steam (preferably, at temperatures of from about 140° F. to about 212° F.). Further, in this or other aspects, the backing composition 32 is one of a latex composition and a hot melt adhesive. Whether water-soluble or not, the adhesive backing composition 32 penetrates the yarns (stitches 12); secures the reinforcement fibers 36 into a solid, stable layer; and, in the case of the methods illustrated in FIGS. 10B, 10C, and 17, forms a thin backing layer on the back side of the floor covering 2 with the yarn stitches 12 acting as a filtration media to the reinforcement fibers 36.

Prior to application, the fiber-reinforced adhesive composition (1032, as shown in FIG. 10A) may have a stringy appearance. The inclusion of the reinforcement fibers 36 allows the backing composition 32 to be incorporated with air (frothed), leading to weight reductions in the floor covering 2. As a result, the floor covering 2 has lower manufacturing and shipping costs.

It has been found that the addition of the reinforcement fibers 36 does not affect the actual viscosity and/or performance of the adhesive polymer composition 32. Therefore, the penetration of the adhesive composition 32 into the yarns 10 is unaffected. In fact, the addition of the reinforcement fibers 36 causes the adhesive composition 32 to function as a higher viscosity composition during application, permitting lower viscosity (2000-6000 centipoise) adhesive compositions 32 to be employed without the problems (e.g., bleed-through and puddle control) often associated with these lower viscosity compositions. Thus, the range of viscosities of the adhesive compositions 32 is expanded from extremely low viscosity to high viscosity compounds, such as those found within a range of from about 2,000 centipoise to about 12,000 centipoise.

The present floor coverings with the inventive reinforcement layer are produced in a manner contrary to all previous carpet manufacturing techniques. As discussed in the Background section, a synthetic secondary reinforcement mat is used in manufacturing wide-width broadloom carpet manufacturing, while secondary reinforcement mats and adhesive layers are used in the "I-beam" construction of modular floor coverings. The present reinforcement layer 16 replaces both of these prior constructions and the costs associated with these components (that is, pre-formed mats and joining polymer layers). In fact, because of the stability imparted by the reinforcement layer 16, the reinforcement layer 16 may function as a universal backing that is appropriate for both broadloom and modular floor coverings. The universal applicability of this high-performing reinforcement layer 16 has the potential to greatly simplify the manufacturing process and to greatly reduce the costs associated with the floor covering production. With only one polymer system (i.e., adhesive backing composition 32), the manufacturing process is simple, and recycling is facilitated.

Preferably, the reinforcement layer 16 is as thin and as light-weight as possible to ensure the flexibility of the finished floor covering. Due to the overlapping of the reinforcement fibers 36 and the fact that the fibers 36 are embedded within the polymer backing layer, even a thin reinforcement layer 16 provides the desired stabilizing functionality. Additionally, by keeping the reinforcement layer 16 thin, costs of producing the floor covering are reduced, as compared with conventional multi-layer floor coverings, which require high weight to maintain their planarity. The approach described herein represents a fundamental difference in the philosophy used to create traditional modular floor covering with an "I-beam" construction and broadloom with polymer secondary backings.

According to a first aspect of the present disclosure, one method for the application of the fiber-containing adhesive backing composition 1032 is illustrated in FIG. 10A. In this method, the tufted textile substrate 14 is placed face side down and conveyed beneath an applicator roll 1006. The applicator roll 1006 applies sufficient pressure, in a controlled manner, to push the adhesive backing composition 32 into the yarns 10 and away from the reinforcement fibers 36.

The length and diameter of the fibers 36 prevents the fibers 36 from penetrating the yarns 10 (that is, the fibers 36 are larger than the interstitial space between the yarns 10). Instead, the conveyance of the tufted textile substrate 14 beneath the applicator roll 1006 causes the fibers 36 to be aligned predominantly in the machine direction in a continuous, overlapping sheet along the backside of the tufted substrate 14. Without wishing to be bound by theory, it is believed that this unexpected fiber alignment occurs due to the motion of the tufted textile substrate 14 creating friction with the reinforcement fibers 36 within the adhesive backing composition 32. The fibers 36 are held in position by the adhesive backing composition 32, when cured.

It is well known in the carpet industry that the machine direction of a carpet is the greatest contributor to stability problems. The "machine direction" is considered the direction in which the yarn is tufted. The yarns 10, which form a continuous series of loops in the machine direction, are inherently unstable, especially when exposed to heat and/or moisture. Additionally, the primary backing substrates (having their own inherent machine direction) tend to experience more shrinkage in the machine direction of the floor covering. It has also been observed that the processing of the tufted textile substrate 14 (and the resulting floor covering) imparts tension to the floor covering in the machine direction. For these reasons, the machine direction is almost always the more unstable direction of the floor covering.

Because the instability in conventional floor coverings is greater in the machine direction, the alignment of the fibers 36 in the machine direction contributes significantly to the stability of the present floor covering 2. This alignment cannot be obtained in a pre-formed reinforcement backing substrate without the addition of specially aligned reinforcement yarns by the reinforcement backing manufacturer. The space or voids between adjacent tufted yarns 10 contains strands of reinforcement fibers 36, which form columns of reinforcement in the machine direction as a result of the application methods described with reference to FIG. 10A, which produces the floor covering 2 shown in FIG. 9.

Another method for applying the fiber-reinforced adhesive composition is shown in FIG. 10B. In this method, the tufted textile substrate 14 is placed face side up and conveyed beneath an applicator roll 1006 on a conveyor belt 1016. Alternately, a plate or drum may be used instead of the conveyor belt 1016. The fiber-reinforced adhesive composition 1032 is deposited directly onto the belt 1016, and the tufted textile substrate 14 is rolled onto the surface containing the fiber-reinforced adhesive composition 1032.

Unlike the approach shown in FIG. 10A, the approach in FIG. 10B does not disperse a puddle of adhesive 32 directly onto the tufted textile substrate 14. As a result, better control of the adhesive penetration is realized, and the rolling and weight differentials caused by an uneven adhesive puddle are reduced or eliminated. As with the method in FIG. 10A, the applicator roll 1006 applies sufficient pressure, in a controlled manner, to push the adhesive backing composition 32 into the yarns 10 and away from the fibers 36, resulting in the formation of a continuous layer of randomly oriented fibers on the back side of the tufted substrate.

Another benefit of the approach shown in FIG. 10B is achieved, as will be described below with reference to FIG. 10C. In this illustration, the yarns 15 form a cut pile as part of a tufted textile substrate 17, but a loop pile may be used instead, as shown in FIG. 10B. The belt 1016 (or plate or drum) may be provided with a texture from weaving or embossing, and that texture is imparted to the polymer backing 32 of the floor covering (e.g., 2). Preferably, the belt 1016 has a pattern, or texture, smaller than the length of the fibers 36, such that the fibers 36 are positioned along the upper surfaces of the belt 1016 and pushed into the adhesive polymer 32 (rather than being trapped in the "valleys" of the texture). According to one aspect, the belt 1016 is a woven or embossed substrate with closely spaced yarns or dimpled regions, which allow the fibers 36 to bridge the interstitial gap between yarns in the belt 1016. Additionally, the interstitial gap between yarns is relatively shallow, providing only a small area for adhesive accumulation between the yarns of the belt 1016.

The appropriate texture on the belt 1016 causes the adhesive coating 32 to encase the reinforcement fibers 36. The back side of the floor covering has a thin layer of adhesive coating 32 with a decorative texture but devoid of fibers 36 (as shown in FIG. 11). The embedded fibers 36 provide stability to the floor covering, and the adhesive backing 32 prevents pilling and fuzzing of the yarns 15. Additionally, the textured surface on the back of the floor covering 4 may help to maintain the position of the floor covering 4, when installed, particularly if the adhesive backing composition 32 possesses a high coefficient of friction or a degree of tackiness.

In addition to the foregoing methods for applying the adhesive coating 32 containing the reinforcement fibers 36, other methods are possible. For example, the fiber containing adhesive may be placed in a pan having an applicator roll, then the carper is passed over roll so that the adhesive/fiber mixture is directly transferred to the backside of the carpet substrate. Also, a pre-formed reinforcement fabric such as a wet laid non woven fiberglass sheet is laminated to the carpet substrate directly using an adhesive. The adhesive is first pressed into the carpet substrate yarn and the pre-formed reinforcement fabric is pressed onto the adhesively coated substrate allowing partial penetration into the reinforcement fabric to allow lamination. Other methods of applying the adhesive/fiber mixture will be apparent to those of ordinary skill in the art.

There are several different methods of incorporating the reinforcement fibers 36 into the backing composition 32, some of which are provided as follows by way of example and not limitation. First, a sprayer, working in conjunction with a roving cutter, can apply the cut fibers 36 and the polymer backing composition 32 simultaneously (for example, directly onto the conveyor belt 1016). Alternately, the roving cutter may feed an extrusion head, which blends the fibers 36 with an adhesive composition 32 before application to the textile substrate 14. In another variation, a "fiber-stuffing" extrusion head may be used. In yet another approach, the fibers 36 may be injected (a) continuously into the frothing equipment used to prepare the adhesive backing composition 32; or (b) into the pipe used to supply the adhesive backing composition 32, using either a static or dynamic mixer positioned in-line with the supply pipe. Another way of producing a fiber-reinforced adhesive layer is applying the adhesive backing composition 32 to the textile substrate and then pressing or blending the reinforcing fibers 36 into the wet polymer.

It is contemplated that the reinforcement fibers 36 may be incorporated into the adhesive backing composition 32 during the compounding process. Such compounding may occur in a tank that is pump- or gravity-fed to the application site. To prevent loose fibers from contaminating the manufacturing facility, the reinforcement fibers 36 may be introduced in dissolvable bags that are introduced into the adhesive compounding tank. This approach ensures the appropriate ratio of fiber to adhesive in the compound and facilitates the handling of the fibers.

Regardless of how the reinforcement fibers 36 are introduced into the adhesive backing composition 32, uniform dispersion of the fibers 36 is preferred to ensure consistent and uniform placement on the back side of the primary textile substrate 20. In addition to its role as a joining compound, the adhesive backing composition 32 also coats the fibers 36 and prevents the possibility of skin irritation that may occur from exposure to the uncoated fibers 36 (when fiberglass).

In the various embodiments described herein (and not with limitation to any one particular embodiment), the fiber-reinforced adhesive add-on weight may fall within the range of about 15 to about 40 ounces/square yard (when dry). In one particular configuration, when using a graphics tufted substrate, the add-on weight may be about 25 ounces/square yard to achieve the desired adhesive penetration and to form the reinforcement layer 16. For other tufted substrates, which have fewer yarns (stitches) on the back side, the add-on weight may be toward the lower end of the range (e.g., about 18 ounces/square yard to about 20 ounces/square yard).

With conventional floor coverings in which a pre-formed reinforcement mat is encapsulated within a thermoset or thermoplastic polymer backing layer, the curing and cooling processes are time-consuming and may result in shrinkage of the primary backing substrate. The present approach allows the fibers 36 in the reinforcement layer 16 to move along with the textile substrate 14 until the adhesive 32 cures, thus resulting in a more planar floor covering with dimensionally similar textile substrate 14 and reinforcement layer 16. In addition to being more reproducible, the floor covering 2 produced by the methods described herein are less likely to have built-in stress, which, if released later, can cause curling or cupping of the floor covering 2.

It has been found that the present floor covering made by the present processes is most stable and more flexible when there is a close contacting relationship between the reinforcement fibers 36 and the tufted textile substrate 14. Contrary to existing carpet manufacturing processes, which place a pre-formed reinforcement mat as far away as possible from the face to obtain the largest "I-beam" possible, the present methods produce an inventive floor covering in which the distance between the primary backing substrate 20 and the reinforcement fibers 36 is as close as possible. To that end, the stitches 12 on the back side of the primary backing substrate 20 have been found to be the limiting factor in determining how closely the reinforcement fibers 36 may be positioned.

To reduce the distance between the reinforcement fibers 36 and the yarns 10, it is possible to flatten and to compress the stitch portions 12 of the yarns 10 before the adhesive backing composition 32 is applied. Because the yarn bundles 10 are 80-90% air on average, the yarns 10 may be compressed easily. However, the yarns 10 are bulky and recover quickly without the application of some force to hold the yarns 10 in a compressed configuration.

FIG. 11 illustrates a floor covering 4 having flattened stitches 13. As can be seen, the stitches 13 of the yarns 10 on the back side of the primary backing substrate 20 are flattened and are in close proximity to the primary backing substrate 20. The adhesive backing composition 32 penetrates both the stitches 13 and the reinforcement fibers 36, thereby forming the floor covering 4. The reinforcement fibers 36 are dispersed in a continuous layer and may be aligned predominantly in the machine direction, as shown in FIG. 9, or may be more randomly oriented as a result of the processes shown in FIGS. 10B and 10C.

The yarns 10 may be compressed or flattened, using pressure, heat, and/or moisture (for lubrication). The tuft bind of the yarns 10 is increased, since the flattened yarns function as a "rivet" on the back side of the primary backing substrate 20. An application (i.e., "pre-spray") of a low-viscosity starch (polysaccharide) or adhesive holds the heat-flattened yarns 10 in their compressed shape throughout the application and curing of the fiber-reinforced adhesive backing layer 16. Because the pre-spray penetrates the yarns 10 and holds the yarns 10 in a bundle, pilling and fuzzing are also reduced.

Another benefit of flattening the yarn stitches 13 is that the volume of air voids in the yarn bundles 10 is reduced and a lower add-on weight of adhesive 32 is required. As a result of the lower adhesive content, the floor covering 4 cures faster, requires less heat for curing, and is lighter weight, more flexible, and less expensive to produce. The greater flexibility and improved drape qualities of the floor covering 4 lead to its conformance to the floor, due to the removal or reduction of the internal stresses that could contribute to cupping or curling. Thus, installation may be easily accomplished with only a thin layer of installation adhesive or even none at all. Moreover, cutting of the present flooring product (e.g., 4) is much easier during installation.

Occasionally, the tufting process used to produce the tufted textile substrate 14 may generate "tags" on the back side of the primary backing substrate 20. These "tags" are either imperfect tufts of yarns 10 or pulled tufted yarns that require mending on the tufting machine. The flattening process has been found effective at remedying these defects. The addition of the reinforcement fibers 36 within the adhesive backing layer 32 forms a continuous fibrous layer, which conceals these defects. Any optional backing layers, as may be described herein, further camouflage these defects, especially if the stitch portions 13 of the yarns 10 are pressed flat before adhesive application.

The continuous fiber layer formed by the fiber-reinforced adhesive backing composition imparts stability to the present floor coverings, regardless of whether the floor covering is used as a broadloom or a modular product. In many respects, the application of other backing layers would be detrimental and have a negative impact on the flexibility and cost of the floor covering. If a supplemental, decorative coating was desired to enhance the appearance of the product, it is preferable that a light coating of the same polymer as the adhesive backing be used to aid in recycling efforts.

FIG. 12 illustrates a floor covering 6 having such an optional, decorative backing layer 42. In this exemplary construction with a supplemental backing, the optional backing layer 42 is a decorative coating or thin film, which does not affect the stability of the floor covering 6. By incorporating a colorant into the adhesive backing compound 32, maximum coverage of the fibers 36 may be achieved with the thinnest coating possible. It is envisioned that different colors and/or polymers could be used as indicators of different manufacturers or specific properties of the floor covering 6. In another aspect, by using a hot water-soluble compound for the layer 42, the ability to recycle the floor covering 6 is not adversely impacted. The optional backing layer 42 may be unnecessary in floor coverings produced using the process described in FIG. 10C, since that process results in its own aesthetically pleasing surface.

In another aspect, illustrated in FIG. 13, the supplemental backing layer may be a cushion layer 80 that is added to the reinforcement layer 16 to produce a cushioned floor covering 8. The cushion layer 80 may be made of polyurethane, latex, felt, or any other suitable cushion material, as known in the art and/or described herein. As with cushion-back floor coverings described above, the cushion layer 80 may be protected by a pre-formed reinforcement mat 75 (although the pre-formed reinforcement mat 75 is not required in installations where flooring adhesive is omitted). The fibers 36 provide the requisite stability and facilitate the adhesive delivery, while the additional cushion layer 80 improves the comfort level of the floor covering 8. It is also believed the fibers 36 prevent the floor covering 8 from being damaged when removed from the floor.

Alternately, instead of a cushion layer 80 and protective reinforcement mat 75, the supplemental backing may be another decorative backing 90 that is applied to the reinforcement layer that includes the fibers 36, as shown in FIG. 14. The decorative backing 90 may be used to add additional coverage of the reinforcement fibers 36, to add weight to the floor covering (if needed for some reason), or to distinguish one manufacturer from another. The backing layer 90 may be made discontinuous, as shown, by using engraving or pattern rolls to apply the polymer. By forming the backing layer 90 as a discontinuous layer, it is potentially easier for the backing layer 90 to break apart in the recycling process and to be separated from the adhesive-coated fibers 36. Further, the discontinuous character of the backing layer 90 preserves the flexibility of the floor covering 102.

The backing layer 90 may also be made from a hot-water dissolvable polymer, so that the backing layer 90 dissolves and is easily separated from the tufted textile substrate (10, 20) and reinforcement fibers 36. Alternately, the backing layer 90 may be made from a non-dissolvable polymer (such as a PVC, a hot-melt adhesive, or a polyurethane), and the separation and segregation of the components may be aided by the discontinuous or segmented nature of the backing layer 90. Upon dissolution of the adhesive composition 36, the segmented backing layer 90 may be broken into pieces that may be extracted from the liquefied adhesive and repurposed into other products.

Another alternative contemplated herein is a floor covering 115, as shown in FIG. 15, in which the fibers 36 are randomly dispersed within a discontinuous polymer backing layer 92 rather than within an adhesive pre-coat composition 32 used to secure the yarns 10 within the primary backing substrate 20. In this aspect, the backing layer 92 possesses the desired stabilizing properties and flexibility, despite weighing considerably less than the multi-layer backing systems (with pre-formed mats) used in traditional floor coverings. The backing layer 92 may be made of PVC, polyurethane, water-based adhesives, or a hot-melt adhesive compound, which particularly benefits from the incorporation of fibers 36 to prevent creep, cold flow, or plasticizer migration. The resulting floor covering 115 has sufficient flexibility to "hug" the floor, as compared with conventional modular floor coverings having an "I-beam" construction.

FIG. 16 shows a floor covering 108, which includes the plurality of yarns 10 tufted through the primary backing substrate 20. According to previous embodiments, the stitch portions of the yarns 10 are secured using the adhesive polymer composition 32, but this time using the adhesive composition 32 alone as a pre-coat. A second adhesive backing composition 46, which contains reinforcement fibers 36, forms a continuous reinforcement layer on the back side of the tufted textile substrate. The second adhesive backing 46 may be the same or different polymer from the adhesive polymer composition 32 used as a pre-coat.

The floor covering 108 of FIG. 16 may be produced by the method shown in FIG. 17, in which the current technology of a roll-over-roll (or plate) configuration is used. Advantageously, existing coating equipment may be employed, including a first roll 1008 and a second roll 1010 that apply the adhesive pre-coat composition 32 to the back side of the tufted textile substrate 14 to secure the yarn stitches 12. The penetration of the adhesive composition 32 into the yarns 10 can be varied depending on the yarn types, the size of the yarns, the viscosity of the adhesive, and the pressure of the rolls 1008, 1010, as is understood in the application of pre-coat adhesive layers according to current practice. The applicator roll 1006 directs the fiber-reinforced adhesive composition 1032 onto the conveyor belt 1016 where the fiber-reinforced composition 1032 coats the adhesively bound yarns 10 and forms a reinforced backing layer 46 by filling the voids between the coated yarn stitches.

This approach offers several potential advantages. First, the volume of adhesive material 32 (collectively, in the pre-coat 32 and the backing layer 46) may be reduced. Secondly, as mentioned above, the pre-coat adhesive composition 32 and/or its viscosity may be different from the backing adhesive composition 46 and/or its viscosity. Recycling may be facilitated if the adhesive pre-coat composition 32 and the adhesive backing composition 46 are of the same polymer, and the polymer is hot water-soluble. If the compositions are of different polymers, it may be necessary to cure or process the adhesive pre-coat composition 32 before application of the fiber-reinforced adhesive composition 1032.

Another advantage of this two-coat method is that the adhesive compositions may be tailored to the intended use of the floor covering 108, whether as a residential broadloom carpet, a commercial broadloom carpet, or a modular carpet product (such as a tile or rug). For instance, the adhesive compositions used in broadloom carpets may include more filler material, particularly if the loop pile constructions are designed for residential rather than commercial applications. By applying the adhesive compositions 32, 1032 in separate applications, exact control of the penetration and exacting amounts of reinforcement fibers 36 may be achieved to permit the in-situ formation of the reinforcement layer. Examples produced according to this method are provided as Examples 10-13.

The present floor covering products, as produced according to the processes shown in FIGS. 10A-10C and FIG. 17, for example, may be used as a broadloom carpet or may be cut into modular units (i.e., carpet tiles, area rugs, mats, or runners). When used as a broadloom carpet, the dimensional stability provided by the present reinforcement layer allows installation without the damage to walls or doorways that may otherwise occur when a conventional broadloom carpet is stretched and attached to a tack strip.

In addition to the benefits of dimensional stability and flexibility, the present universal backing provides a non-scratch surface that is particularly well-suited for area rugs that may be laid over hardwood flooring. Area rugs may be of any desired dimensions, from small area rugs and runners to large, room-size rugs. Moreover, the flexibility of the present floor coverings makes them useful as carpeting for stairs, where a roll of the present floor covering may be cut to the desired dimensions and installed conventionally without fear that the floor covering will "grow" over time and produce a tripping hazard.

When cut into tiles, the tile dimensions may be small (12"×12") or medium-sized (36"×36"), as with conventional carpet tiles, or the tiles may have a large size (such as 6'×6' or 6'×12' panels), the latter of which may be comparable to an area rug and neither of which is achievable with conventional tile manufacturing methods. Large size modular products or rugs, like broadloom products, are sufficiently flexible to permit rolling and may be shipped conveniently on a roll or in a rolled-up configuration. By way of example and not limitation, it is conceived that multiple large size modular panels could be shipped together on the same roll. For instance, as many as ten 6'×12' panels could be shipped on one roll to provide sufficient floor coverings to cover 120 linear feet, without exceeding weight restrictions for shipping or handling.

Specifically, the modular floor covering products may be any of a circular carpet, an oval carpet, a carpet tile, a carpet panel, an area rug, a runner, and a floor covering for stairs, any of the carpet tile, the carpet panel, the area rug, the runner, and the floor covering for stairs having a polygonal shape. The polygonal shape may be a square, a rectangle, or a triangle, by way of example only and not limitation.

Further, because it is possible to produce broadloom and modular floor coverings with the same thickness and dimensional stability, it is conceivable that both types of floor coverings may be installed together in the same room or in adjacent rooms. For example, within a single room, the majority of the floor may be covered with an unstretched broadloom, according to the teachings herein, while the perimeter of the room or other areas may be covered with tiles to create a decorative feature. In a multi-room installation, one room may be covered with an unstretched broadloom floor covering, while an adjacent room is covered with modular tiles, both the broadloom and the tiles being produced from the same production run (i.e., same textile substrate) and having the same thickness.

Installation

To accommodate the numerous floor covering constructions described in the Background section, manufacturers and installers have developed a large number of installation techniques to promote the durability and comfort of the floor covering. For example, broadloom carpets in residential installations are typically stretched and attached to tack strips installed around the perimeter of a room, as shown in FIG. 18. As shown, a cushion layer 2280 may be laid on the floor 2000, and a tack strip 2004 may be placed around the perimeter of the room in close proximity to a wall 2002. A carpet having a tufted textile substrate (represented as face yarns 2210) is stretched, using a power stretcher, and tucked behind the tack strip 2004. Optionally, in large commercial rooms where stretching is not possible, an adhesive layer (not shown) may be applied to the floor and to the cushion layer 2280 prior to the application of the carpet 2210 in a "double-stick" installation.

The objective of using a power stretcher is to prevent wrinkles from forming in the floor covering over time, as may occur with repeated foot traffic. As discussed in the Background section, even with residential-size rooms, it may be necessary to employ seaming tape to produce a floor covering of the desired room dimensions. Seaming tapes use a hot-melt adhesive, which require a heated seaming iron to melt. The heat imparted by the seaming iron may be detrimental to the backing substrates used in the floor covering, as well as posing potential safety concerns to the installer.

Power stretching may only be used in relatively small, residential-size rooms, and has been found unsuitable for large commercial-size rooms, as may be found in open office environments. In large commercial installations where power stretching is impractical, the floor covering is designed for gluing directly to the floor 2000 or to a cushion layer 2280, which may also be glued to the floor (in a "double-stick" installation).

Traditionally, whether used to secure the floor covering directly to the floor 2000 or to a separate cushion layer (e.g., 2280), the flooring adhesive is applied using either a paint roller or a grooved trowel. The application method used to apply the flooring adhesive determines the adhesive surface area available for contact with the floor covering (that is, when the flooring adhesive is applied with a grooved trowel, there are fewer contact points between the floor covering and the flooring adhesive). In modular floor covering installations, pressure sensitive adhesives are used to maintain the removability of the modular floor covering, but it should be noted that the pressure sensitive adhesive is ineffective at maintaining stiff modular floor coverings in a planar position. For installations of broadloom products having reduced stability, permanent flooring adhesives are used. Removal of such glued installations is both expensive and time-consuming.

In contrast, the present floor covering (as shown in FIGS. 9 and 11-16) with its universal fiber-reinforced backing system possesses sufficient stability and flexibility to permit any installation techniques that are desired by the end user, but without the need for stretching the textile component and without the need for a permanent flooring adhesive. The elimination of the power stretching step preserves the integrity of the floor covering, greatly simplifies the installation, and reduces the time required for installation. In addition, residential installation techniques (such as the use of tack strips) may be applied in commercial settings, thus expanding the market for the present floor covering.

Whether a broadloom installation or a modular flooring installation, the present floor covering may be installed using no adhesive at all (a "floating" installation, as shown in FIG. 19A) or, if desired, using a grid or spots of pressure sensitive adhesive applied to the floor (previously described as a "free lay" installation, not shown).

In another variation, the floor covering may be provided with a backing that has a high coefficient of friction. The high coefficient of friction backing may be a separate layer or may result from the selection of the backing adhesive containing the reinforcement fibers. Examples of a high coefficient of friction material include acrylic or natural latex. The high coefficient of friction coating may be applied to the cushion or to the floor, as well as to the carpet backing. The resulting joining of the high coefficient of friction layers increases exponentially the friction effect.

In FIG. 19A, the floor covering 2202 having a tufted textile substrate 2214 and a fiber-reinforced adhesive layer 2216 is installed on a floor 2000. The edge of the floor covering 2202 is positioned adjacent the wall 2002. In this aspect, the installation is a floating installation, in which no adhesive is used between the floor 2000 and the reinforced adhesive layer 2216. As illustrated, the floor covering 2202 is a modular floor covering with adjacent tiles abutting one another at a seam 2208. However, the floor covering 2202 may instead be a broadloom floor covering installed without adhesive, as described above. When a broadloom floor covering is desired, the floor covering may be installed in an unstretched condition.

Where necessary to accommodate room size (e.g., in commercial settings), a piece of the floor covering 2202 may be joined to another piece of the floor covering 2202 using hot melt tape or a pressure sensitive adhesive tape. The fiber-reinforced backing 2216 is sufficiently stable to withstand the application of hot melt adhesive tape. However, using a pressure sensitive adhesive tape removes the need for a heated seaming iron and, possibly, eliminates the use of seaming tape altogether.

FIG. 19B illustrates an alternate installation technique. According to this aspect, a low-profile tack strip 2006, which has a profile that is thinner than the thickness of the floor covering, is installed adjacent the wall 2002. The floor covering having a tufted textile substrate 2214 and a fiber-reinforced adhesive layer 2216 is secured to the tack strip 2006. Specifically, the floor covering is wrapped over the tack strip 2006 and between the tack strip 2006 and the wall 2002.

Using tack strips 2006 has many advantages. Specifically, without a tack strip 2006, the floor covering must be cut with a high degree of precision to produce to the desired "cut quality" around the perimeter of a room. However, when a tack strip 2006 is used, the appearance of an improved cut quality is achieved, while eliminating the need for exact cutting of the floor covering around the room perimeter and door jambs.

Unlike conventional floor covering installations, the floor covering is installed in an unstretched configuration (that is, without being stretched by a power stretcher). Because the requirement for stretching has been eliminated due to the dimensional stability provided by the fiber-reinforced backing, broadloom installations of the present floor covering are much simpler and quicker. Further, the present broadloom installations are suitable for large, commercial installations, including installations over a cushion and without installation adhesives.

Alternately, instead of a tack strip 2006, an application of pressure sensitive adhesive around the perimeter of the room may be used. Such an approach would be ineffective with conventional broadloom floor coverings, which—if tack strips are not used—require permanent adhesive coverage over the entire floor. Another issue with an adhesive installation method is that the floor covering must be cut with precision along the walls and the door jambs, because the cut edges will be exposed after installation.

As shown in FIG. 19C, a floor covering having a tufted textile substrate 2214, a fiber-reinforced adhesive layer 2216, and an attached (or unattached) cushion layer 2282 may also be installed without a flooring adhesive. When the floor covering is provided with an attached cushion layer 2282 as in FIG. 19C, the likelihood of movement or slipping is reduced further (even without flooring adhesive). Without wishing to be bound by theory, it is believed that the additional thickness and/or weight may contribute to the increased positional stability of the floor covering. The floor covering may be a broadloom floor covering or a modular flooring product. Optionally, a grid of adhesive may be used, but such adhesive application is not required. Because the floor covering exhibits high dimensional stability without risk of cupping or curling, the purpose of the floor adhesive is merely to prevent the floor covering from moving or slipping during use.

Instead of having an attached cushion layer (as in FIG. 19B), broadloom or modular installations may be installed over a detached cushion layer to increase the comfort level afforded by the floor covering. Manufacturers may recommend particular cushions to achieve the desired comfort level, while the final decision remains with the consumer. It is possible that the thin cushions used in today's installations of laminate flooring may be used with the present floor covering.

The cushion may be a floating installation without adhesive or may be attached to the floor with spots or grids of adhesive. The floor covering may be laid over the cushion without adhesive or may be attached to the cushion with spots or grids of adhesive. The cushion may be provided with a thin film, which acts as a moisture barrier. The film may also prevent any liquid adhesive from penetrating the cushion. The film may be integral with the cushion layer or may be applied as a separate layer before the floor covering is laid.

Another envisioned technique for installing the modular floor covering uses modular "cushion tiles" beneath the floor covering tiles, as shown in FIG. 19D. The floor covering tiles may be produced with precisely cut edges, making the floor covering suitable for use as tiles, mats, or area rugs. The flexibility and stability of the modular floor coverings described herein permit the cut panels to be rolled onto a tube for shipment.

When used in a tile-over-tile installation, the cushion tiles may be provided with a film layer, and the film layer may extend beyond one or more edges of the cushion. The extending film segment overlaps the edge of an adjacent cushion, thereby providing moisture barrier properties to the floor covering, particularly along the otherwise vulnerable seams. The cushion tiles may be rotated during installation, so that the tiles are adjoined in different directions, thereby eliminating the requirement for heat-sealing the seams (as is necessary in hospital and health care settings where there are concerns that moisture will produce microbial growth). The overlapping film segment also helps to secure the cushion tiles together.

In one aspect shown in FIG. 19D, if medium or large size tiles or panels 2208 are used, cushion tiles 2380 may be cut to a smaller dimension than the modular floor covering panel 2208. The floor covering tiles 2208 abut one another at seams 2203, while the cushion tiles abut one another at seams 2283, as illustrated. This installation technique permits the large modular floor covering panel 2208 to be folded back, rolled back, or removed to access the underlying cushion tiles 2380, which may also be removed for entry into under-floor utilities (such as those used for electrical, telephone, or HVAC equipment). Thus, the servicing of the wiring or equipment may be accomplished quickly and with minimal disruption to the floor covering installation as a whole.

In summary, the dimensional stability of the present floor covering products permits a wide range of installation methods to be employed with or without adhesive. The installations are simpler than those used with conventional floor coverings, and new markets are now available.

The present disclosure describes a floor covering having fiber-reinforced layer and methods for installing the floor covering. It should be noted that the features described herein may be utilized in any suitable combination, and all permutations of such combinations are presently contemplated. By way of example, a method of installing the present floor covering may be described in the following clauses, which are offered in further support of the present disclosure:

Embodiment 1

A method of installing a dimensionally stable floor covering, the method comprising: (a) providing a dimensionally stable floor covering, the floor covering comprising a tufted textile substrate comprising a backing substrate having a face side and a back side opposite the face side; and a plurality of yarns tufted through the primary backing substrate, a portion of each yarn forming a stitch located on the back side of the primary backing substrate; and a reinforcement layer comprising an adhesive composition and a plurality of fibers, wherein the fibers are encased by the adhesive composition and form a fiber-reinforced adhesive layer on the back side of the primary backing substrate and the stitch portion of each yarn are penetrated by the adhesive composition; (b) measuring the floor covering to fit dimensions of a room in which the floor covering is to be installed; (c) cutting the floor covering to fit the dimensions of the room; and (d) laying the floor covering in the room.

Embodiment 2

The method of embodiment 1, further comprising: installing a tack strip adjacent a perimeter of the room; and attaching a cut edge of the floor covering to the tack strip.

Embodiment 3

The method defined in any preceding embodiment, further comprising: applying a pressure sensitive adhesive to a floor in the room.

Embodiment 4

The method defined in any preceding embodiment, wherein the pressure sensitive adhesive is applied in a grid pattern.

Embodiment 5

The method defined in any preceding embodiment, further comprising: disposing a cushion on a floor of the room before laying the floor covering.

Embodiment 6

The method of defined in any preceding embodiment, wherein the floor covering is an unstretched broadloom floor covering.

Embodiment 7

The method defined in any preceding embodiment, wherein the floor covering is a modular floor covering.

Embodiment 8

The method defined in any preceding embodiment, further comprising: cutting the cushion into tiles before disposing the cushion on the floor.

Embodiment 9

The method defined in any preceding embodiment, wherein the floor covering is a modular panel having dimensions larger than the cushion tiles.

Recycling

When the floor covering becomes dirty or stained, it is desirable to recycle the floor covering, rather than landfilling or incinerating the floor covering. The present recycling process may also be used for waste from the manufacturing of the present floor covering. Such recycling may be accomplished by exposing the floor covering to an environment not normally encountered during regular use (that is, exposure to hot water or steam at temperatures between 140° F. and 212° F.).

FIG. 20 shows a representative equipment installation for the recycling of the present floor covering product, according to one aspect provided herein in which the adhesive composition used in the reinforcement layer is dissolvable in hot water or steam. This process may be used when the adhesive composition is made from one or more of starch, PVA, and polyester, or other hot water-soluble compositions.

The floor covering (e.g., 2) is placed onto an open mesh conveyor belt 2016 (mesh openings not shown). The conveyor belt 2016 carries the floor covering 2 through a first steam chamber 2000, where the floor covering 2 is heated with steam (at 212° F.) and the adhesive composition 32 in the fiber reinforced layer 16 begins to be softened or melt. The floor covering 2 is then conveyed over a first steam injector zone 2010 in which high pressure steam nozzles 2012 direct streams of steam at the fiber reinforced layer 16. The steam both dissolves the adhesive composition 36 and dislodges the fiber reinforced layer 16. A pair of rolls 2026 with an associated belt or plate prevents the floor covering 2 from being displaced off the conveyor belt 2016 when impacted by the steam streams.

In the first steam injector zone 2010, the adhesive composition 32 may begin to dissolve and detach from the textile substrate 14. The fibers 36 embedded in the reinforcement layer 16 may be carried with the dissolved adhesive composition into the drain 2036, which leads to a collection tank (not shown).

A second steam chamber 2040 introduces additional hot moisture into the remaining portions of the fiber reinforced layer 16. The second steam chamber 2040, in addition to dissolving the adhesive composition 36, serves to clean the textile substrate 14 (yarns and primary backing substrate).

A second steam injection zone 2050 having high pressure steam nozzles 2052 directs additional streams of steam against the fiber reinforced layer 16, causing the adhesive composition 36 to fully dissolve and be transported with the embedded fibers into the drain 2036. Again, a pair of rolls 2056 with an associated belt or plate prevents the textile substrate 14 from being displaced off the conveyor belt 2016 when impacted by the steam streams.

FIG. 20 illustrates the floor covering 2 in the form of a modular tile, but the method is applicable to floor coverings in any shape, including broadloom floor coverings. The steam chambers 2000, 2040 may be of different lengths, as appropriate. Likewise, the number of steam nozzles 2012, 2052, their respective volumes and/or pressures, in the respective steam injection zones 2010, 2050 may be the same or different, as needs dictate. If desired, the recycling process may be discontinuous. Surfactants, water jets, or combinations of both may be used in one or more of the steam injection zones 2010, 2050, or in the steam chambers 2000, 2040.

While two sets of steam chambers and steam injection zones are illustrated, any number of chambers and zones may be used, as necessary to fully dissolve the adhesive composition and clean the textile substrate.

If the yarns and primary backing substrate are made from the same polymer (e.g., nylon 6 or nylon 6,6), the entire textile substrate may be chopped, pelletized, and extruded into a new primary backing or a molded polymer product. In the case of nylon, the recovered polymer can be re-extruded into new nylon fibers. When recycled in this manner, the resulting product typically has a gray color, which well-suited for use as a primary backing substrate.

When the yarns and the primary backing substrate are made of different polymers, the textile substrate may be ground or cut into short lengths. The resulting short fibers may be needle-punched into a new cushion for the present floor covering or into a new woven primary base to form a primary backing substrate that does not ravel at the edges.

Alternately, the cleaned yarns may be cut from the face of the primary backing substrate and themselves incorporated as reinforcement fibers in the present floor coverings or other products. This method may be useful when the yarns are frayed or have an otherwise unsuitable appearance.

It should be noted that the water added to dissolve the adhesive composition is useful in rehydrating the adhesive composition for reuse. For instance, the water content in the virgin adhesive composition may contain a relatively large volume (e.g., 20%-50%) of water. Thus, considerable water (in the form of steam) may be used to dissolve the adhesive composition without adversely affecting the recyclability of the reclaimed adhesive composition. The reclaimed adhesive composition may be used to produce a fiber-reinforced backing layer on a virgin textile substrate. If desired, the reinforcement fibers may be screened from the diluted adhesive, permitting the adhesive composition to be used as a pre-coat or for some other purpose.

Moreover, it is expected that dirt may be entrained in the dissolved adhesive composition. The inclusion of dirt into the adhesive composition is acceptable, as the dirt functions as a filler material.

Another option for recycling the present floor covering is to submerge and tumble the floor covering in a laundry tub or washing vessel at elevated temperatures. One appropriate piece of equipment for such a process is a commercial washing machine, which dissolves the adhesive and includes a spin cycle for extracting the water from the textile substrate when the cycle is complete. While capable of removing the reinforcement layer, it is expected that submerging the floor covering will require a greater volume of water and result in a more diluted adhesive composition for recycling.

With either recycling method, the primary backing substrate (that is, the tufting substrate) may be made of a hot water-soluble material. In this instance, the primary backing substrate may be dissolved along with the reinforcement layer.

The present floor coverings with their hot water soluble polymer reinforcement layers facilitate recycling and reuse, thereby representing advances over the prior art. As discussed previously, the use of multiple, dissimilar layers in conventional floor covering constructions—such as thermoplastic and thermosets—prevents those floor coverings from being recycled easily.

The present disclosure describes a floor covering having fiber-reinforced layer and methods for recycling the floor covering. It should be noted that the features described herein may be utilized in any suitable combination, and all permutations of such combinations are presently contemplated. By way of example, a method of recycling the present floor covering may be described in the following clauses, which are offered in further support of the present disclosure:

Embodiment 1

A method of recycling a floor covering, the floor covering comprising a tufted textile substrate comprising a primary backing substrate having a face side and a back side opposite the face side; and a plurality of yarns tufted through the primary backing substrate, a portion of each yarn forming a stitch located on the back side of the primary backing substrate; and a reinforcement layer comprising a hot water soluble adhesive composition and a plurality of fibers, wherein the fibers are encased by the adhesive composition and form a fiber-reinforced layer on the back side of the primary backing substrate and the stitch portions of each yarn are penetrated by the adhesive composition; the method comprising: (a) conveying the floor covering through a steam chamber, in which the floor covering is exposed to steam; (b) directing high pressure streams of steam from a plurality of steam nozzles toward the reinforcement layer of the floor covering, thereby dissolving the hot water soluble adhesive composition; (c) repeating steps (a) and (b) as needed to fully dissolve the adhesive composition; and (d) collecting the dissolved adhesive composition.

Embodiment 2

The method of Embodiment 1, wherein conveying the floor covering through the steam chamber comprises positioning the floor covering onto an open mesh conveyor belt, such that the reinforcement layer is in contact with the conveyor belt.

Embodiment 3

The method defined in any preceding embodiment, further comprising: introducing surfactants into the steam in the steam chamber.

Embodiment 4

The method defined in any preceding embodiment, further comprising: collecting the reinforcement fibers along with the dissolved adhesive composition.

Embodiment 5

The method defined in any preceding embodiment, further comprising: reusing the dissolved adhesive composition.

Embodiment 6

The method defined in any preceding embodiment, further comprising: screening the dissolved adhesive composition to separate the reinforcement fibers.

Embodiment 7

The method defined in any preceding embodiment, further comprising: chopping, pelletizing, and extruding the tufted textile substrate.

Embodiment 8

The method defined in any preceding embodiment, further comprising: grinding the tufted textile substrate.

Embodiment 9

The method defined in any preceding embodiment, further comprising: cutting the yarns from the face side of the tufted textile substrate and incorporating the cut yarns into an adhesive composition for a virgin textile substrate.

Examples

The representative Examples are provided to illustrate, but not limit, various embodiments of the present invention.

Components

The exemplary floor coverings included a textile face, at least one polymeric adhesive compound, and a reinforcement fiber.

Textile Face

The same textile face was used in all Examples. The textile face incorporated components used in conventional carpet constructions.

Specifically, the textile face was a graphics-tufted textile having a commodity-grade woven polypropylene primary backing substrate and nylon yarns. The weight of the primary backing substrate was 4 ounces/square yard. The face weight of the nylon yarns was 25 ounces/square yard.

Polymer Compounds

The Examples provided herein incorporated one or more of the following commerciality available polymer compositions as the adhesive composition and/or backing component. Although exact formulations are unknown, the properties of the compounds are recorded in TABLE 1 below.

TABLE 1

| | Adhesive Compositions | | | |
|---|---|---|---|---|
| ID | Name (Manufacturer, City, State) | Filler Content | Viscosity | Solids Level |
| 1 | VAE latex (Air Products, Dalton, GA) | 150 parts | 4,000 cps | 80% |
| 2 | PVC (Calhoun Chemicals, Dalton, GA) | unknown | 4,000 cps | 100% |
| 3 | EVA hot-melt (Reynolds Adhesive, Dalton, GA) | unknown | 4,000 cps | 100% |
| 4 | PVA/polyester latex (Seydel-Woolley, Pendergrass, GA) | unknown | 4,000 cps | unknown |

The VAE latex was frothed to half its original weight before application. No frothing was performed with the other adhesive compounds.

The PVA/polyester latex is not ordinarily used as an adhesive pre-coat layer. However, since this compound is hot-water soluble at temperatures of about 175° F., it was used to illustrate the type of compounds useful in certain aspects of the present technology where recycling is desired.

Reinforcement Fibers

Glass fibers were used as the reinforcement fiber in all examples. The glass fibers were categorized as "size E" in diameter and had a length of about 0.25 inches, which is consistent with the size and length used in conventional pre-formed reinforcement layers. The glass fibers used herein were distributed by Nycon of Fairless Hills, Pa.

Application Techniques

Dispersion rates were chosen to result in <0.5 ounces/square yard of reinforcement fiber after coating of the tufted substrates.

The Examples were prepared in accordance with methods described in the specification. Accordingly, reference is made in Table 2 below to the accompanying Figures that describe the adhesive application method.

TABLE 2

| | Examples | | | | | | |
|---|---|---|---|---|---|---|---|
| Ex. No. | Application Method (FIG.) | Adhesive Composition | Fibers in Adh. Comp.? | Adhesive Add-on Weight (oz/yd²) | Backing Layer | Fibers in Backing Layer? | Relative Flexibility (1-10, 10 being most flexible) |
| 1 | 10A | VAE latex | Yes | 16 | Paint | No | 7 |
| 2 | 10A | PVC | Yes | 50 | Paint | No | 9 |
| 3 | 10B/10C | VAE latex | Yes | 25 | Patterned surface | No | 7 |
| 4 | 10B/10C | PVC | Yes | 48 | Patterned surface | No | 9 |
| 5 | 10B/10C | EVA | Yes | 50 | Patterned surface | No | 5 |
| 6 | 10A/10B | VAE latex | Yes | 16 | EVA hot-melt (15 oz/yd²) | No | 5 |
| 7 | 10A/10B | VAE latex | Yes | 16 | PVC (12 oz/yd²) | No | 6 |
| 8 | 10B/10C | PVA/polyester | Yes | 30 | Patterned surface | No | 7 |
| 9 | 10A | VAE latex | No | 16 | EVA hot-melt (60 oz/yd²) | Yes | 3 |
| 10 | 17 | VAE latex | No | 15 | VAE latex (10 oz/yd²) | Yes | 7 |
| 11 | 17 | VAE latex | No | 25 | VAE latex (10 oz/yd²) | Yes | 5 |
| 12 | 17 | VAE latex | No | 15 | VAE latex (10 oz/yd²) | Yes | 5 |

TABLE 2-continued

Examples

| Ex. No. | Application Method (FIG.) | Adhesive Composition | Fibers in Adh. Comp.? | Adhesive Add-on Weight (oz/yd²) | Backing Layer | Fibers in Backing Layer? | Relative Flexibility (1-10, 10 being most flexible) |
|---|---|---|---|---|---|---|---|
| 13 | 17 | VAE latex | No | 15 | VAE latex (15 oz/yd²) | Yes | 9 |

Example Preparation

Examples 1 and 2 were painted with acrylic paint.

Examples 6 and 7 were prepared by using the method described with reference to FIG. 10A for application of the adhesive composition and the method described with reference to FIGS. 10B and 10C for the application of the backing polymer composition.

Example 8 was made with a PVA/polyester adhesive (a hot water dissolvable latex) at a dry weight of 20 oz/yd² with reinforcement fibers. A small square of the coated carpet was placed into boiling water and rinsed. All adhesive was removed to facilitate recycling, thereby showing the recyclability of the present floor coverings.

Example 9 was prepared using a pre-coat application of adhesive as described with reference to FIG. 10A. The backing layer was a hot-melt adhesive polymer to which reinforcement fibers were added, which was applied using conventional techniques. The VAE latex was cured before application of the EVA hot-melt.

Example 11 was made using a tufted textile substrate having a needle-bonded fiber-lock-weave (FLW) primary backing substrate. Examples 10 and 12 were made using a tufted textile substrate having a nonwoven primary backing substrate.

Example 13 was made using a nonwoven primary substrate. The VAE latex formulation included less filler material than the formulation used in Examples 1, 3, 6, 7, and 9-12.

Example Observations

Examples 1-7, 9, and 10 could not be manually delaminated. Example 8 required a force of approximately 3 pounds per inch to be manually delaminated.

Because there is not a standard test for flexibility, the flexibility was compared to a PVC hard-back tile. The stiffness of the PVC hard-back tile was assigned a flexibility score of 1. Higher numbers indicate a greater degree of flexibility, with a score of 10 being the highest possible score and being indicative of highest drape.

The samples were balanced on a dowel, such as a broom handle, and the degree to which the samples bent around the dowel determined the score assigned to their flexibility.

The PVC-backed floor coverings of Examples 2 and 4 exhibited the greatest degree of flexibility, while the floor covering of Example 9 (produced by the two-step adhesive coating method of FIG. 17 and having the greatest amount of backing material) possessed the greatest stiffness. It should be noted that the stiffness of EX. 9 was still more flexible than the conventional PVC hard-back tile, although made of hot-melt which is normally not as flexible as PVC.

Example Evaluation

The Aachen Stability Test (ITTS-004) is the standard stability test used throughout the floor covering industry for both modular and broadloom carpet. The test method includes the following steps: (a) the floor covering sample was measured; (b) the floor covering sample was placed in an oven at 60° C. for two hours, removed, and measured; (c) the floor covering sample was placed in a solution at 20° C. for two hours, removed, and measured; (d) the floor covering sample was placed in an oven at 60° C. for twenty-four hours, removed, and measured; and (e) the floor covering sample was placed in a standard climate at 21° C. and 65% relative humidity for forty-eight hours, removed, and measured.

Samples are considered stable, if at the end of testing, the dimensional change (shrinkage or growth) is less than 0.027 inches in both directions.

Examples 11 and 12 were evaluated using the Aachen stability test (ITTS-004), and the results are provided below in TABLE 3. The testing was performed by Independent Textile Testing in Dalton, Ga.

TABLE 3

Stability Evaluation

| Sample Tested | Dimensional Change (inches) | Test Pass/Fail |
|---|---|---|
| Example 11 | −0.0188 | Pass |
| Example 12 | −0.0200 | Pass |

The inventive reinforcement layer described herein may permit the floor covering industry to introduce a variety of new products, such as (i) broadlooms of any width and/or length; (ii) modular products of greater width; (iii) stable area rugs, mats, or runners of any size; (iv) floor covering products capable of installation over a separate pad; (v) dimensionally stable floor coverings capable of installation without installation adhesives; (vi) modular carpet for stairs; (vii) modular floor covering products capable of shipment on rolls; (viii) floor coverings with a non-abrasive backing; and (ix) mix-and-match installations of broadlooms and modular floor coverings, all of which have the same thickness. Such products may be installed and recycled using the methods described herein.

Moreover, the inventive reinforcement layer and methods are applicable to other commercial applications, including, but not limited to, (i) upholstery fabrics; (ii) industrial fabrics; (iii) roofing membranes and asphalt shingles; and (iv) cushion products and/or layered products that use any adhesive compound and that require stabilization. In the case of an upholstery or industrial fabric, the tufted textile substrate is replaced with a flat fabric (such as a woven or nonwoven fabric) that is subsequently backed with the present fiber-reinforced adhesive layer. Roofing membranes and asphalt shingles may be made by replacing one or more of the individual polymer layers applied to the woven or nonwoven substrate with the present fiber-reinforced adhesive layer. Similarly, vinyl floorings made with preformed fiberglass substrates coated with layers of PVC or other polymers may be produced by replacing one or more of the polymeric layers with the present fiber-reinforced adhesive layer. Such products expand the market available to manufacturers employing the present manufacturing methods and products.

Advantageously, these products may be manufactured using known materials and with readily available equipment at lower manufacturing and raw material costs and with reduced off-quality than is expected with current floor covering products. The universal backing described herein is well-suited for use with a variety of incorporated or separate layers (e.g., cushions attached to the floor covering or to the floor) and, because of this manufacturing flexibility, is ideal for manufacturers seeking to inventory the floor covering, pending specific customer orders for a broadloom or modular floor covering product.

Specifically, the manufacturer may pull a certain length of the present floor covering product on one day to fulfill a broadloom order and may pull a second length of the present floor covering product on another day for cutting into modular floor coverings to fulfill a modular order. With either order type, a cushion layer may be incorporated before cutting and/or shipping, and the finished product may be used in residential or commercial settings. No other available floor covering product offers manufacturers this degree of production flexibility, while simultaneously satisfying the performance and stability requirements for the finished product and reducing the manufacturing costs for broadloom and modular products.

Hereinafter are several alternate descriptions of the various inventions set out above.

A dimensionally stable textile floor covering comprising: a tufted textile substrate comprising a primary backing substrate having a face side and a back side opposite the face side; and a plurality of yarns tufted through the primary backing substrate, a portion of each yarn forming a stitch located on the back side of the primary backing substrate; and a reinforcement layer comprising an adhesive composition and a plurality of fibers, wherein the fibers are encased by the adhesive composition and form a fiber-reinforced layer on the back side of the primary backing substrate; wherein the stitch portions of each yarn are penetrated by the adhesive composition. The foregoing floor covering wherein the fibers are dispersed throughout the reinforcement layer. The foregoing floor covering, wherein the fibers form a continuous layer within the adhesive composition of the reinforcement layer. The foregoing floor covering wherein the fibers are aligned in the machine direction within the adhesive composition of the reinforcement layer. The foregoing floor covering wherein the primary backing substrate comprises a woven substrate, the woven substrate comprising yarns selected from the group consisting of polypropylene, polyester, and nylon. The foregoing floor covering wherein the primary backing substrate comprises a dissolvable substrate. The foregoing floor covering wherein the yarns are selected from the group consisting of nylon, polyester, and acrylic. The foregoing floor covering wherein the stitch portions of the yarns are flattened, such that a majority of each of the stitch portions is in contact with the back side of the primary backing substrate. (FIG. 11-14) The foregoing floor covering wherein the adhesive composition is a hot-melt compound or a water-based compound. The foregoing floor covering wherein the adhesive composition is a polyurethane or polyvinyl chloride. The foregoing floor covering wherein the adhesive composition is water-soluble in hot water or steam and comprises one of a polyvinyl alcohol, a polyester, and a starch. The foregoing floor covering wherein the reinforcing fibers are selected from the group consisting of glass fibers, synthetic fibers, and natural fibers. The foregoing floor covering wherein the reinforcing fibers are glass fibers having a size E diameter and a length of about 0.25 inches. The foregoing floor covering further comprising a supplemental backing layer attached to the reinforcement layer. (FIGS. 12, 13, 14) The foregoing floor covering wherein the supplemental backing layer comprises a material selected from the group consisting of polyurethane, polyvinyl chloride, latex, and a hot melt compound. The foregoing floor covering wherein the supplemental backing layer comprises a cushion material. (FIG. 13) The foregoing floor covering wherein the floor covering is a broadloom carpet. The foregoing floor covering wherein the floor covering is a modular carpet having a size ranging from 12"×12" to 6'×12 the floor covering being sufficiently flexible to permit rolling. The foregoing floor covering wherein the modular carpet is a carpet tile, an area rug, a runner, or a floor covering for stairs.

A method of installing a dimensionally stable floor covering, the method comprising: (a) providing a dimensionally stable floor covering, the floor covering comprising a tufted textile substrate comprising a backing substrate having a face side and a back side opposite the face side; and a plurality of yarns tufted through the primary backing substrate, a portion of each yarn forming a stitch located on the back side of the primary backing substrate; and a reinforcement layer comprising an adhesive composition and a plurality of fibers, wherein the fibers are encased by the adhesive composition and form a fiber-reinforced adhesive layer on the back side of the primary backing substrate and the stitch portion of each yarn are penetrated by the adhesive composition; (b) measuring the floor covering to fit dimensions of a room in which the floor covering is to be installed; (c) cutting the floor covering to fit the dimensions of the room; and (d) laying the floor covering in the room. The foregoing method further comprising: installing a tack strip adjacent a perimeter of the room; and attaching a cut edge of the floor covering to the tack strip. The foregoing method further comprising: applying a pressure sensitive adhesive to a floor in the room. The foregoing method wherein the pressure sensitive adhesive is applied in a grid pattern. The foregoing method further comprising: disposing a cushion on a floor of the room before laying the floor covering. The foregoing method wherein the floor covering is an unstretched broadloom floor covering. The foregoing method wherein the floor covering is a modular floor covering. The foregoing method further comprising: cutting the cushion into tiles before disposing the cushion on the floor. The foregoing method wherein the floor covering is a modular panel having dimensions larger than the cushion tiles A method of recycling a floor covering, the floor covering comprising a tufted textile substrate comprising a primary backing substrate having a face side and a back side opposite the face side; and a plurality of yarns tufted through the primary backing substrate, a portion of each yarn forming a stitch located on the back side of the primary backing substrate; and a reinforcement layer comprising a hot water soluble adhesive composition and a plurality of fibers, wherein the fibers are encased by the adhesive composition and form a fiber-reinforced layer on the back side of the primary backing substrate and the stitch portions of each yarn are penetrated by the adhesive composition; the method comprising: (a) conveying the floor covering through a steam chamber, in which the floor covering is exposed to steam; (b) directing high pressure streams of steam from a plurality of steam nozzles toward the reinforcement layer of the floor covering, thereby dissolving the hot water soluble adhesive composition; (c) repeating steps (a) and (b) as needed to fully dissolve the adhesive composition; and (d) collecting the dissolved adhesive composition. The foregoing method wherein conveying the floor covering through the steam chamber comprises positioning the floor covering onto an open mesh conveyor belt, such that the reinforcement layer is in contact with the conveyor belt. The foregoing method further comprising: introducing surfactants into the steam in the steam chamber. The foregoing method further comprising: collecting the reinforcement fibers along with the dissolved adhesive composition. The foregoing method further comprising: reusing the dissolved adhesive composition. The foregoing method further comprising: screening the dissolved adhesive composition to separate the reinforcement fibers. The foregoing method further comprising: chopping, pelletizing, and extruding the tufted textile substrate. The foregoing method further comprising: grinding the tufted textile substrate. The foregoing method further comprising: cutting the yarns from the face side of the tufted textile substrate and incorporating the cut yarns into an adhesive composition for a virgin textile substrate.

What is claimed is:

1. A method of manufacturing a dimensionally stable floor covering having a universal reinforcing backing layer which can be applied to both broadloom and modular floor coverings, the method comprising the steps of:

providing a tufted textile substrate having a primary backing substrate and a plurality of yarns tufted through the primary backing substrate in a first direction, the primary backing substrate having a face side and a back side opposite the face side, a portion of each yarn forming a stitch portion located on the back side of the primary backing substrate, and an interstitial space existing between each yarn;

moving the tufted textile substrate relative to an applicator and providing space between the stitch portions of the yarns and the applicator;

providing a composition having a mixture of adhesive and reinforcement fibers;

applying pressure in a controlled manner between the applicator and tufted textile substrate and pushing the adhesive and reinforcement fiber composition in a second direction that is toward the back side of the primary backing substrate;

aligning the fibers to lay predominately in the first direction during said application of pressure and the movement of the tufted textile substrate, and aligning the reinforcement fibers into a reinforcement layer of fibers that is substantially parallel to the first direction;

providing in situ filtration of the composition for pushing the adhesive away from the reinforcement fibers, pushing only adhesive into the interstitial spaces between the yarns, preventing the fibers from penetrating the interstitial spaces, and laminating the reinforcement layer of fibers together;

forming a wet-laid continuous, overlapping reinforcement layer of the fibers that is substantially parallel to the first direction thereby providing dimensional stability for the entire floor covering; and curing the reinforcement layer of fibers and separated adhesive.

* * * * *